(12) United States Patent
Matsubara et al.

(10) Patent No.: US 10,459,646 B2
(45) Date of Patent: Oct. 29, 2019

(54) SEMICONDUCTOR DEVICE, DATA PROCESSING SYSTEM, AND SEMICONDUCTOR DEVICE CONTROL METHOD

(71) Applicant: RENESAS ELECTRONICS CORPORATION, Tokyo (JP)

(72) Inventors: Katsushige Matsubara, Tokyo (JP); Seiji Mochizuki, Tokyo (JP); Ryoji Hashimoto, Tokyo (JP); Toshiyuki Kaya, Tokyo (JP); Kimihiko Nakazawa, Tokyo (JP); Takahiro Irita, Tokyo (JP); Tetsuji Tsuda, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 34 days.

(21) Appl. No.: 15/355,322

(22) Filed: Nov. 18, 2016

(65) Prior Publication Data
US 2017/0153838 A1 Jun. 1, 2017

(30) Foreign Application Priority Data

Nov. 30, 2015 (JP) .................... 2015-232944

(51) Int. Cl.
| | |
|---|---|
| *G06F 12/00* | (2006.01) |
| *G06F 3/06* | (2006.01) |
| *G06F 7/544* | (2006.01) |
| *H04N 19/423* | (2014.01) |

(Continued)

(52) U.S. Cl.
CPC .......... *G06F 3/0638* (2013.01); *G06F 3/0604* (2013.01); *G06F 3/0656* (2013.01);
(Continued)

(58) Field of Classification Search
CPC ............. G06F 3/0608; G06F 17/30153; G06F 3/0638; G06F 3/064; G06F 9/3001
See application file for complete search history.

(56) References Cited

U.S. PATENT DOCUMENTS

| | | |
|---|---|---|
| 8,001,294 B2 | 8/2011 | Inoue et al. |
| 8,010,746 B2 | 8/2011 | Matsuki |
| | (Continued) | |

FOREIGN PATENT DOCUMENTS

| | | |
|---|---|---|
| EP | 1853067 A1 | 11/2007 |
| JP | H10-27127 A | 1/1998 |
| | (Continued) | |

OTHER PUBLICATIONS

Anonymous: "Double Compression. Oct. 1972", IBM Technical Disclosure Bulletin, vol. 5, No. 15, pp. 1698-1699, 3 pages, XP002115775, ISSN: 0018-8689.

(Continued)

*Primary Examiner* — Mark A Giardino, Jr.
(74) *Attorney, Agent, or Firm* — McDermott Will & Emery LLP

(57) ABSTRACT

Disclosed is a semiconductor device capable of performing compression and decompression with increased appropriateness. The semiconductor device includes a computing module and a memory control module. The computing module includes a computing unit and a compression circuit. The computing unit performs arithmetic processing. The compression circuit compresses data indicative of the result of arithmetic processing. The memory control module includes an access circuit and a decompression circuit. The access circuit writes compressed data into a memory and reads written data from the memory. The decompression circuit decompresses data read from the memory and outputs the decompressed data to the computing module.

15 Claims, 20 Drawing Sheets

(51) Int. Cl.
*G06F 13/00* (2006.01)
*G06F 13/28* (2006.01)

(52) U.S. Cl.
CPC ............ *G06F 3/0673* (2013.01); *G06F 7/544* (2013.01); *H04N 19/423* (2014.11); *G06F 2207/544* (2013.01)

(56) References Cited

U.S. PATENT DOCUMENTS

2012/0072641 A1* 3/2012 Suzuki .................. G06F 3/0608
711/103
2012/0170667 A1    7/2012 Girardeau, Jr. et al.

FOREIGN PATENT DOCUMENTS

| JP | 2009-98822 A | 5/2009 |
| JP | 2010-92499 A | 4/2010 |
| WO | 2008/013802 A2 | 1/2008 |

OTHER PUBLICATIONS

M. Budagavi et al., "Video coding technology proposal by Texas Instruments (and MIT)", Joint Collaborative Team on Video Coding (JCT-VC) of ITU-TSG.16 WP3 and ISO/IEC JTC1/SC29/WG11, 1st Meeting: Dresden, DE Apr. 15-23, 2010. URL: http://WFTP3.ITU.INT/AV-ARCH/JCTVC-SITE/, Document: JCTVC-A101, Apr. 16, 2010, XP030007527, ISSN: 0000-0049.
Extended European Search Report issued in corresponding EP Application No. 16199111.2, dated Mar. 29, 2017.
European Office Action issued in corresponding European Patent Application No. 16199111.2-1208, dated May 16, 2018.
European Office Action issued in corresponding European Patent Application No. 16199111.2-1208, dated Mar. 22, 2019.
Office Action issued in corresponding Japanese Application No. 2015-232944, dated May 21, 2019, with English translation.

* cited by examiner

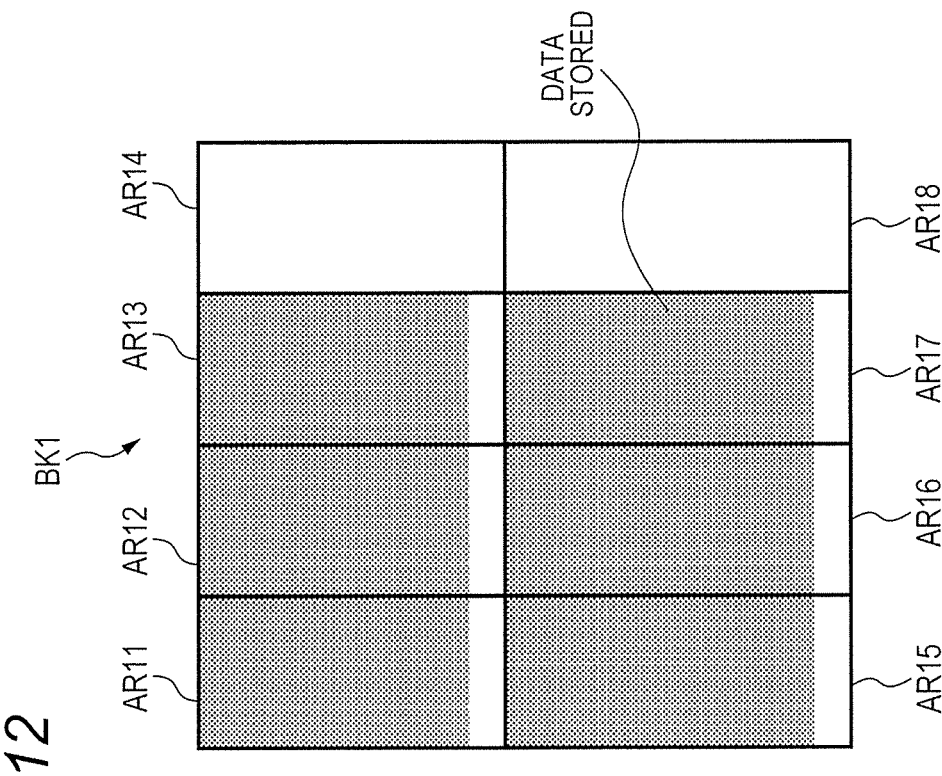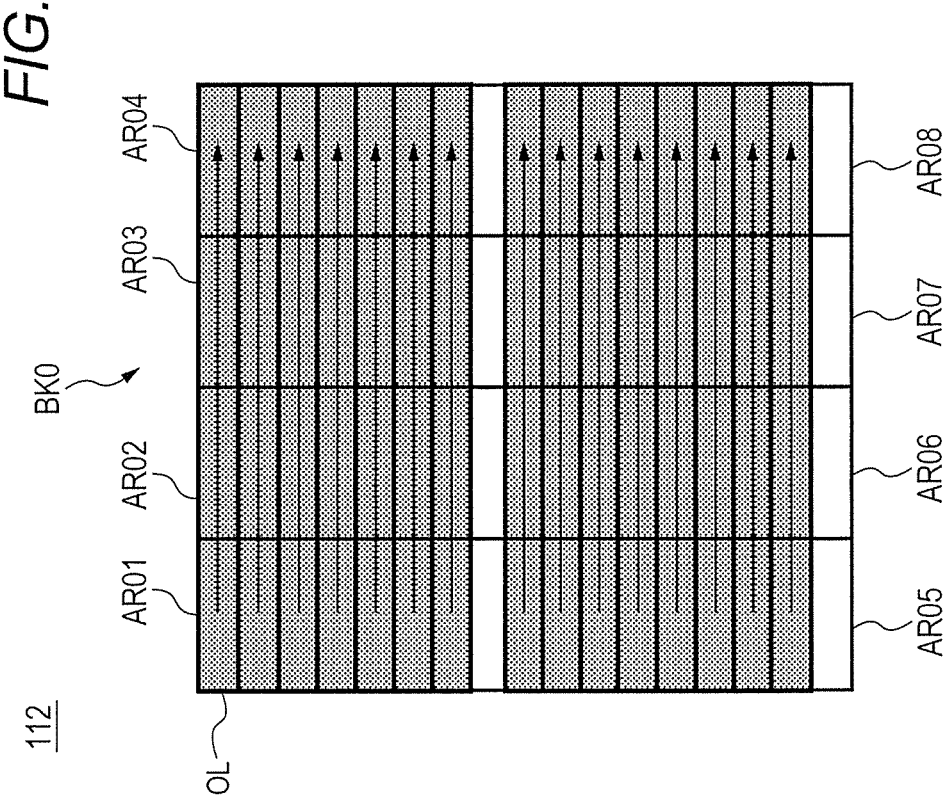
FIG. 12

SEMICONDUCTOR DEVICE, DATA PROCESSING SYSTEM, AND SEMICONDUCTOR DEVICE CONTROL METHOD

CROSS-REFERENCE TO RELATED APPLICATIONS

The disclosure of Japanese Patent Application No. 2015-232944 filed on Nov. 30, 2015 including the specification, drawings, and abstract is incorporated herein by reference in its entirety.

BACKGROUND

The present invention relates to a semiconductor device, a data processing system, and a semiconductor device control method. For example, the present invention relates to a semiconductor device, a data processing system, and a semiconductor device control method that perform arithmetic processing.

In recent years, semiconductor devices that perform image processing and various other arithmetic processing are widely used. When writing images and other data into a memory and reading them from the memory, the semiconductor devices perform, for example, encoding, decoding, compression, and decompression in compliance with a predetermined standard.

A well-known technology related to compression and decompression is described, for instance, in Japanese Unexamined Patent Application Publication No. Hei 10 (1998)-27127. According to Japanese Unexamined Patent Application Publication No. Hei 10 (1998)-27127, a data processing system coupled to a computing unit and a storage device through a bus includes a compression circuit and a decompression circuit, which are disposed between the bus and the computing unit. The compression circuit compresses data indicative of the result of processing by the computing unit and stores the compressed data in the storage device. The decompression circuit decompresses the compressed data read from the storage device and processes the decompressed data with the computing unit.

SUMMARY

The semiconductor devices performing various arithmetic processing preferably perform compression and decompression in an optimal configuration suitable for arithmetic processing. Therefore, an aspect of the present invention has been made in order to perform compression and decompression with increased appropriateness.

Other advantages and novel features will become apparent from the following description and from the accompanying drawings.

According to one aspect of the present invention, there is provided a semiconductor device including a computing module and a memory control module. The computing module includes an arithmetic processing section and a compression section. The memory control module includes an access section and a decompression section. In the computing module, the arithmetic processing section performs arithmetic processing and the compression section compresses data indicative of the result of arithmetic processing. In the memory control module, the access section writes compressed data into a memory and reads written data from the memory, and the decompression section decompresses data read from the memory and outputs the decompressed data to the computing module.

The above aspect of the present invention is capable of performing compression and decompression with increased appropriateness.

BRIEF DESCRIPTION OF THE DRAWINGS

FIG. 12 is a diagram illustrating an input/output operation of the buffer according to the first embodiment;

DETAILED DESCRIPTION

Figure 1:
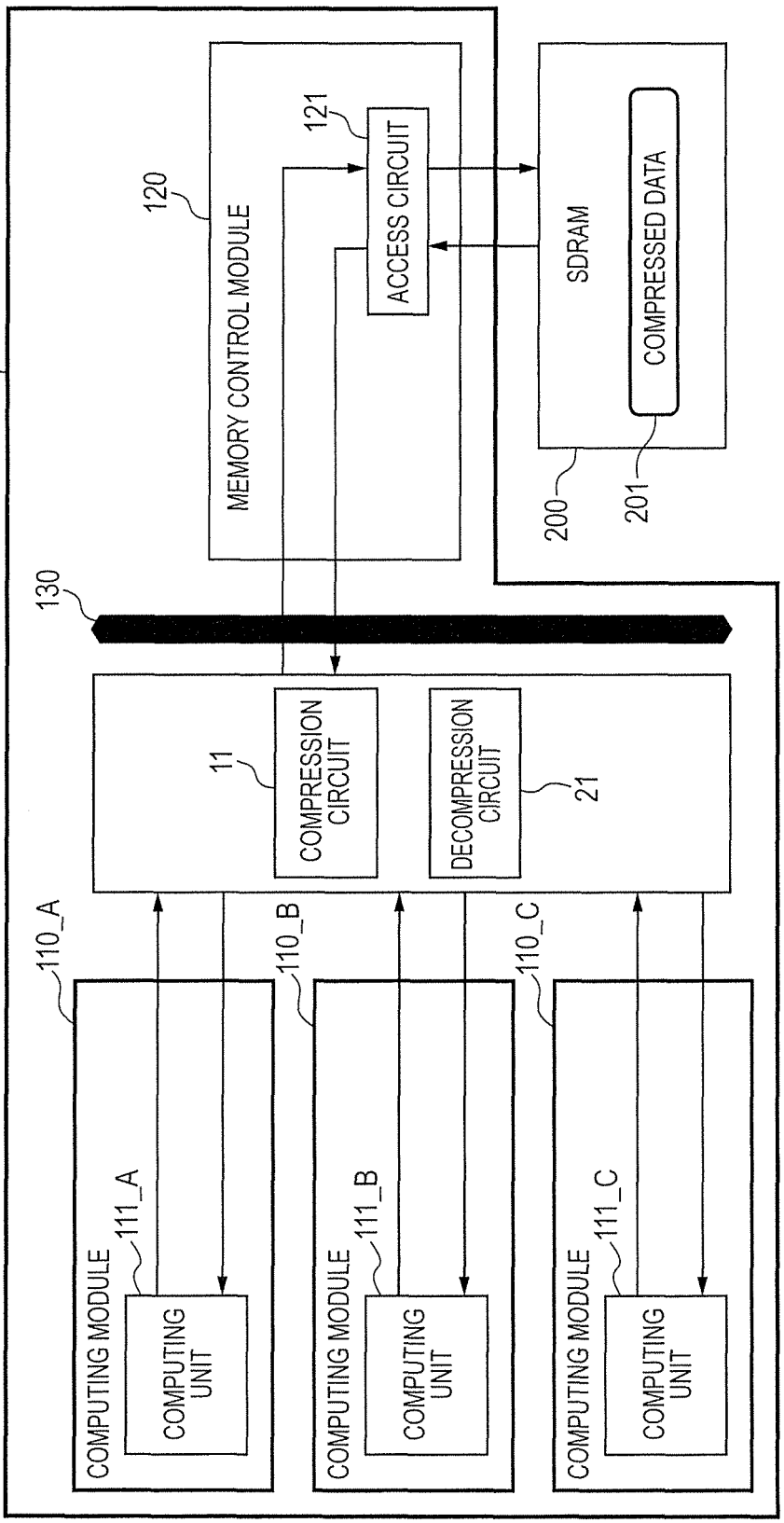
FIG. 1 is a diagram illustrating an exemplary configuration of a data processing system according to a first basic example.

In the following description and in the drawings, omissions and simplifications are made as needed for the clarification of explanation. Further, hardware for various elements depicted in the drawings as functional blocks that perform various processes can be implemented by a CPU, a memory, or other circuit while software for such elements can be implemented, for instance, by a program loaded into a memory. Therefore, it is to be understood by those skilled in the art that the functional blocks are not limited to hardware or software, but can be variously implemented by hardware only, by software only, or by a combination of hardware and software. Further, like elements in the drawings are designated by the same reference numerals and will not be redundantly described.

First to Third Basic Examples

Figure 2:
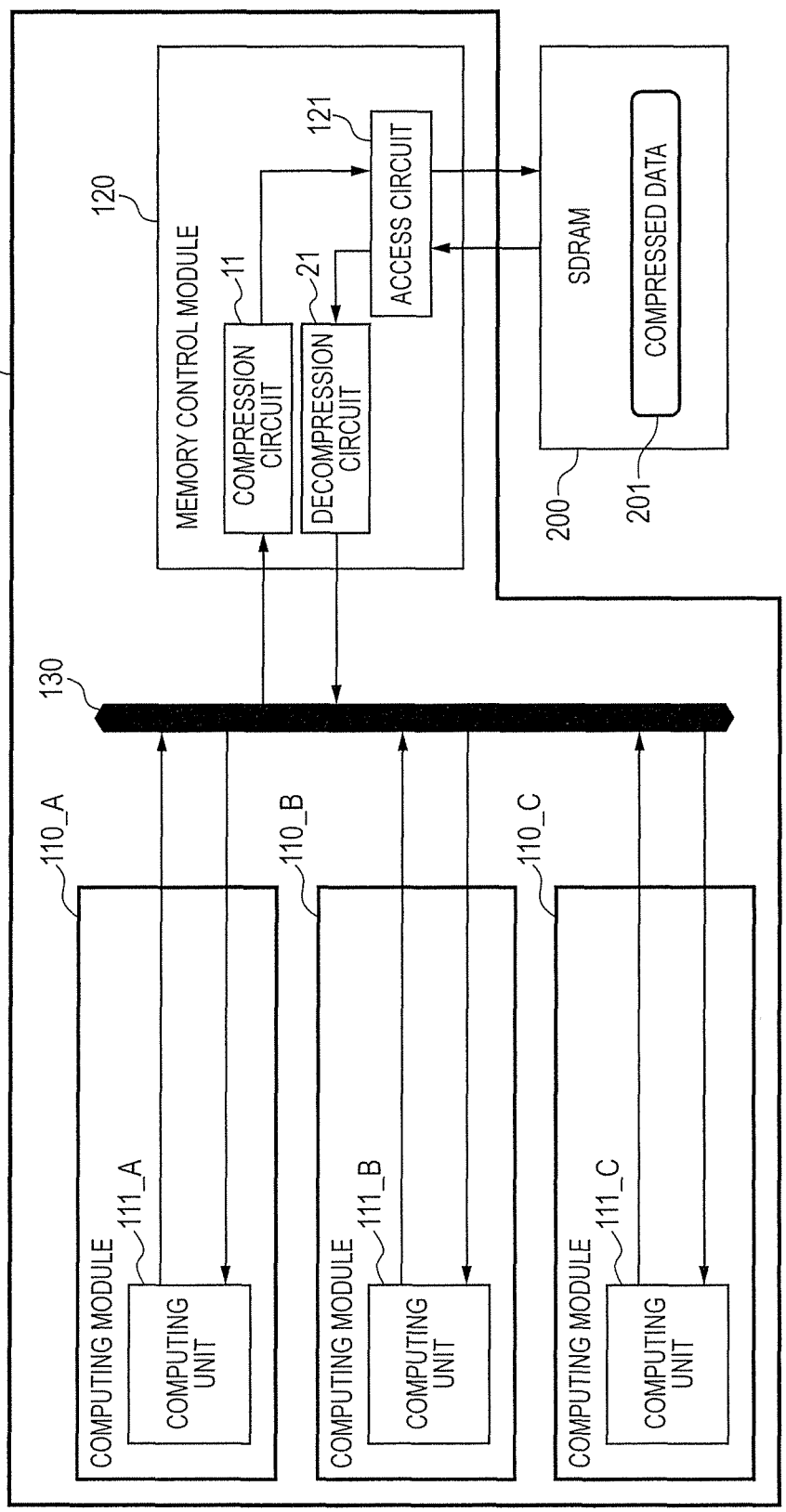
FIG. 2 is a diagram illustrating an exemplary configuration of the data processing system according to a second basic example.
Figure 3:
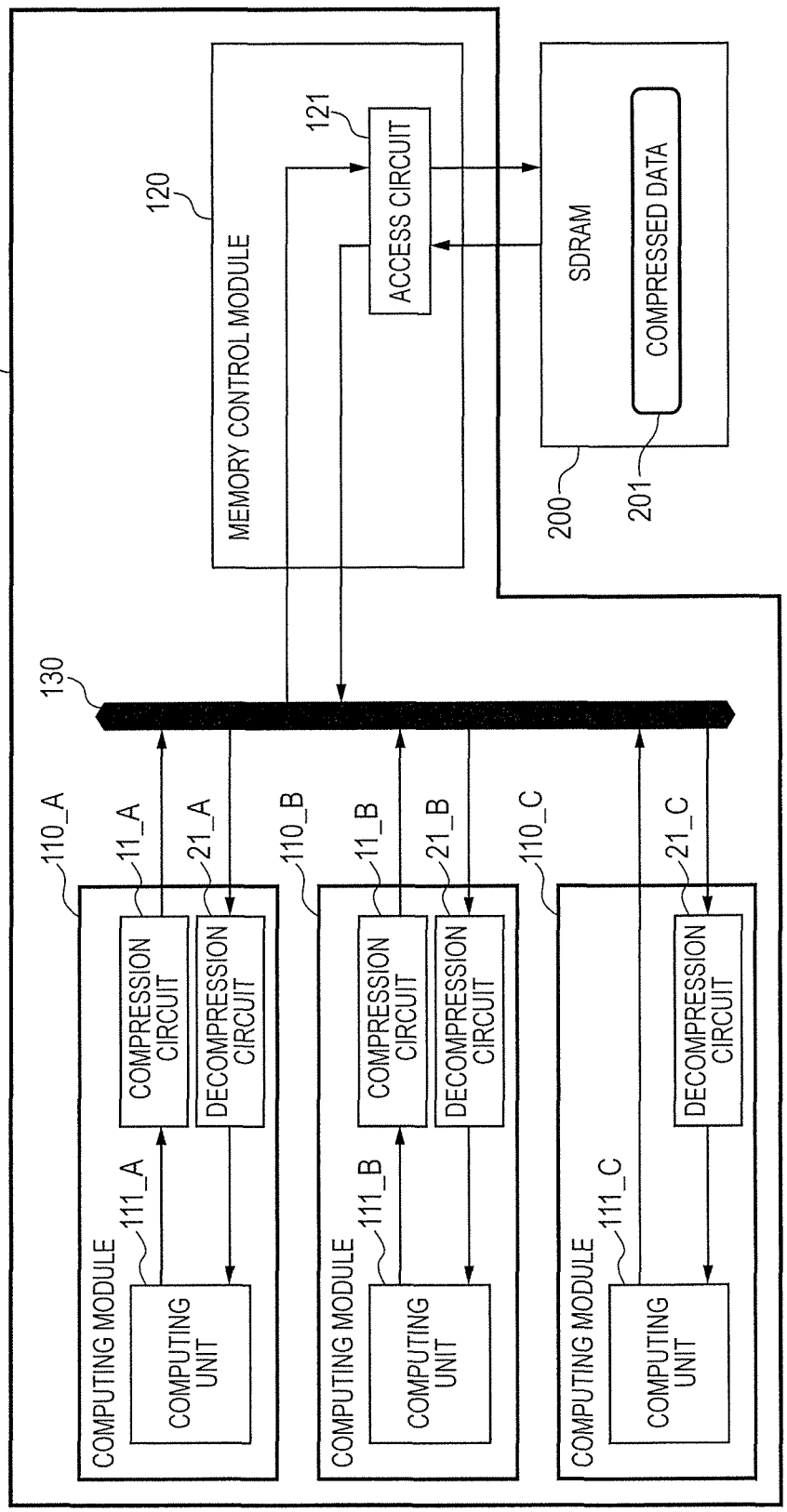
FIG. 3 is a diagram illustrating an exemplary configuration of the data processing system according to a third basic example.

First of all, the first to third basic examples, which configure the fundamentals of embodiments, will be described. FIGS. 1 to 3 respectively illustrate the configurations of data processing systems according to the first, second, and third basic examples.

As illustrated in FIGS. 1 to 3, the data processing systems 91-93 according to the first to third basic examples each include a semiconductor device (LSI) 901-903 and an SDRAM 200. The SDRAM 200 stores data of the semiconductor device 901-903. The semiconductor device 901-903 includes plural computing modules 110 (for example, computing modules 110_A-110_C) and a memory control module 120. The computing modules 110 are coupled to the memory control module 120 through, for example, a data bus 130.

Each of the computing modules 110 acts as a computing section for performing arithmetic processing, and includes a computing unit 111 (111_A-111_C) in order to implement an arithmetic processing function. The memory control module 120 acts as a memory control section for controlling a read/write operation with respect to the SDRAM 200 in compliance with a request from the computing modules 110, and includes an access circuit 121 in order to implement such a control function. The computing units 111 store data in the SDRAM 200 through the data bus 130 and the memory control module 120 and read data from the SDRAM 200. The SDRAM 200 is an example of a memory for storing the data of the semiconductor device, and may therefore be substituted by a different storage device.

The semiconductor device 901-903 further includes a compression circuit 11 and a decompression circuit 21. The compression circuit 11 compresses data indicative of a computation result. The decompression circuit 21 decompresses the compressed data. The semiconductor device 901, the semiconductor device 902, and the semiconductor device 903 are examples that differ in the layout of the compression circuit 11 and the decompression circuit 21.

As illustrated in FIG. 1, the semiconductor device 901 according to the first basic example is configured so that the compression circuit 11 and the decompression circuit 21 are disposed between the computing modules 110 and the data bus 130. The compression circuit 11 and the decompression circuit 21 are in one-to-one relationship to the data bus 130. As illustrated in FIG. 2, the semiconductor device 902 according to the second basic example is configured so that the compression circuit 11 and the decompression circuit 21 are disposed in the memory control module 120. The compression circuit 11 and the decompression circuit 21 are in one-to-one relationship to the memory control module 120.

Each computing unit 111 outputs output data based on the characteristics of its arithmetic processing. That is to say, the address at which the transfer of output data begins, the length of transfer, and the format of data (continuous or discrete) vary from one computing unit to another. When the compression circuit 11 and the decompression circuit 21 are in one-to-one relationship to the data bus 130 or the memory control module 120 as in the first or second basic example, the compression circuit needs to compress the outputs of all computing units 111. In such a case, compression efficiency cannot be increased. More specifically, the same compression circuit is used for compression although the output characteristics vary from one computing unit to another. Thus, compression cannot be performed in a data structure appropriate for compression. This causes a problem where the compression efficiency decreases.

Meanwhile, as illustrated in FIG. 3, the semiconductor device 903 according to the third basic example is configured so that the compression circuit 11 and the decompression circuit 21 are disposed in each computing module 110. The compression circuit 11 and the decompression circuit 21 are in one-to-one relationship to each computing unit 111. Even when the compression circuit 11 and the decompression circuit 21 are in one-to-one relationship to each computing unit 111 as illustrated in the third basic example, the compression efficiency cannot be increased. The reason is that when data indicative of a computation result is to be used by another computing unit, the data needs to be compressed in a common data structure in order to permit the other computing unit to decompress the data. If the common data structure is used for compression, the data cannot be compressed in accordance with the output of each computing unit. This causes a problem similar to the above-mentioned one.

Further, when the configuration illustrated in the third basic example is employed, the computing unit 111_C, which does not perform compression, requires a decompression circuit 21_C to read data compressed by another computing unit 111. Thus, the decompression circuit is required for all the computing units. This causes a problem where a circuit area increases.

Moreover, for example, an SDRAM may be used as the storage device. However, the data may not be continuous in structure depending on the characteristics of data generated by the computing units 111. This causes a problem where the transfer efficiency of the SDRAM cannot readily be increased.

First Embodiment

A first embodiment of the present invention will now be described with reference to the accompanying drawings.

Overview of First Embodiment

Figure 4:
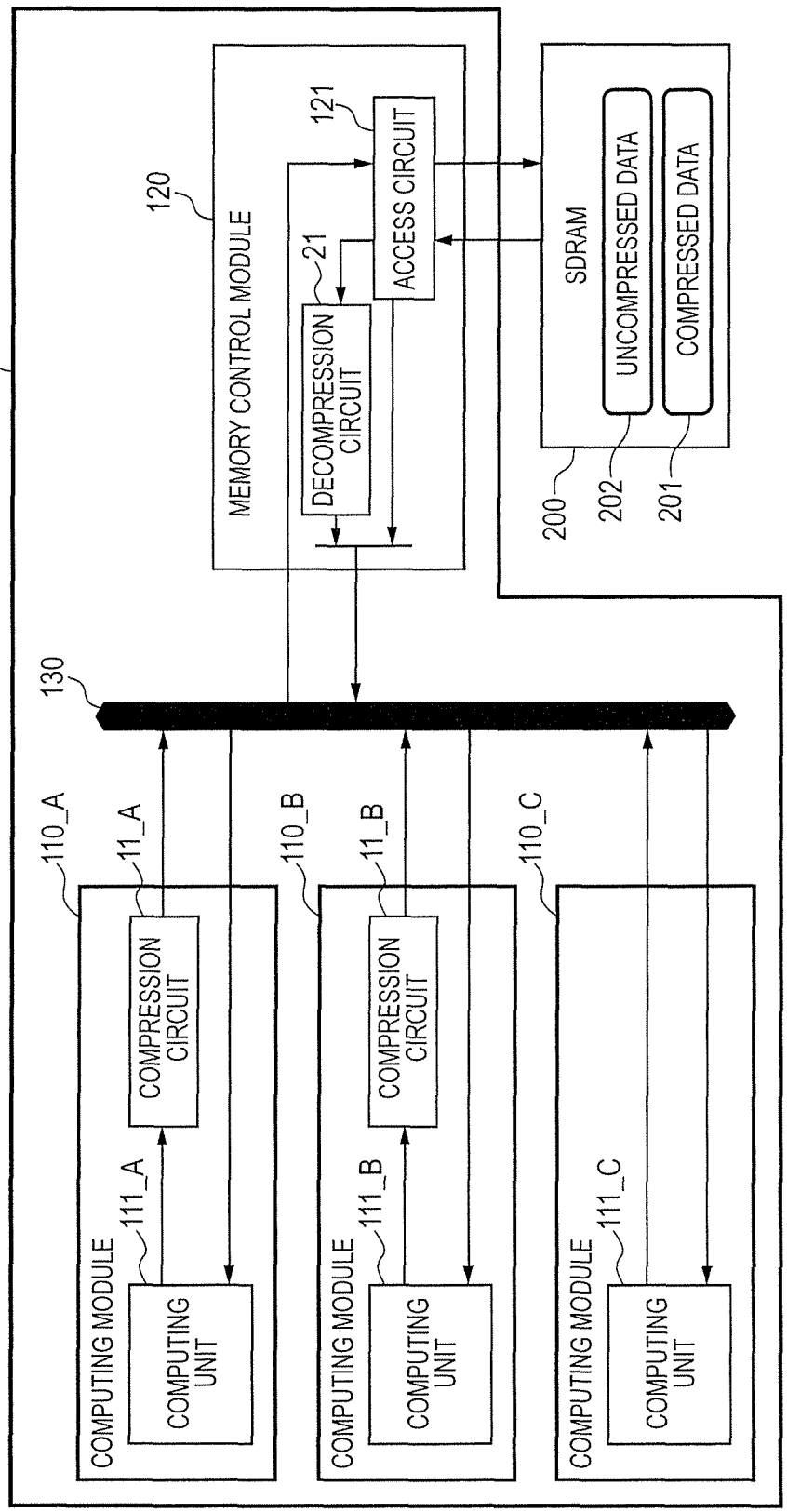
FIG. 4 is a diagram illustrating a schematic configuration of the data processing system according to a first embodiment of the present invention.
Figure 5:
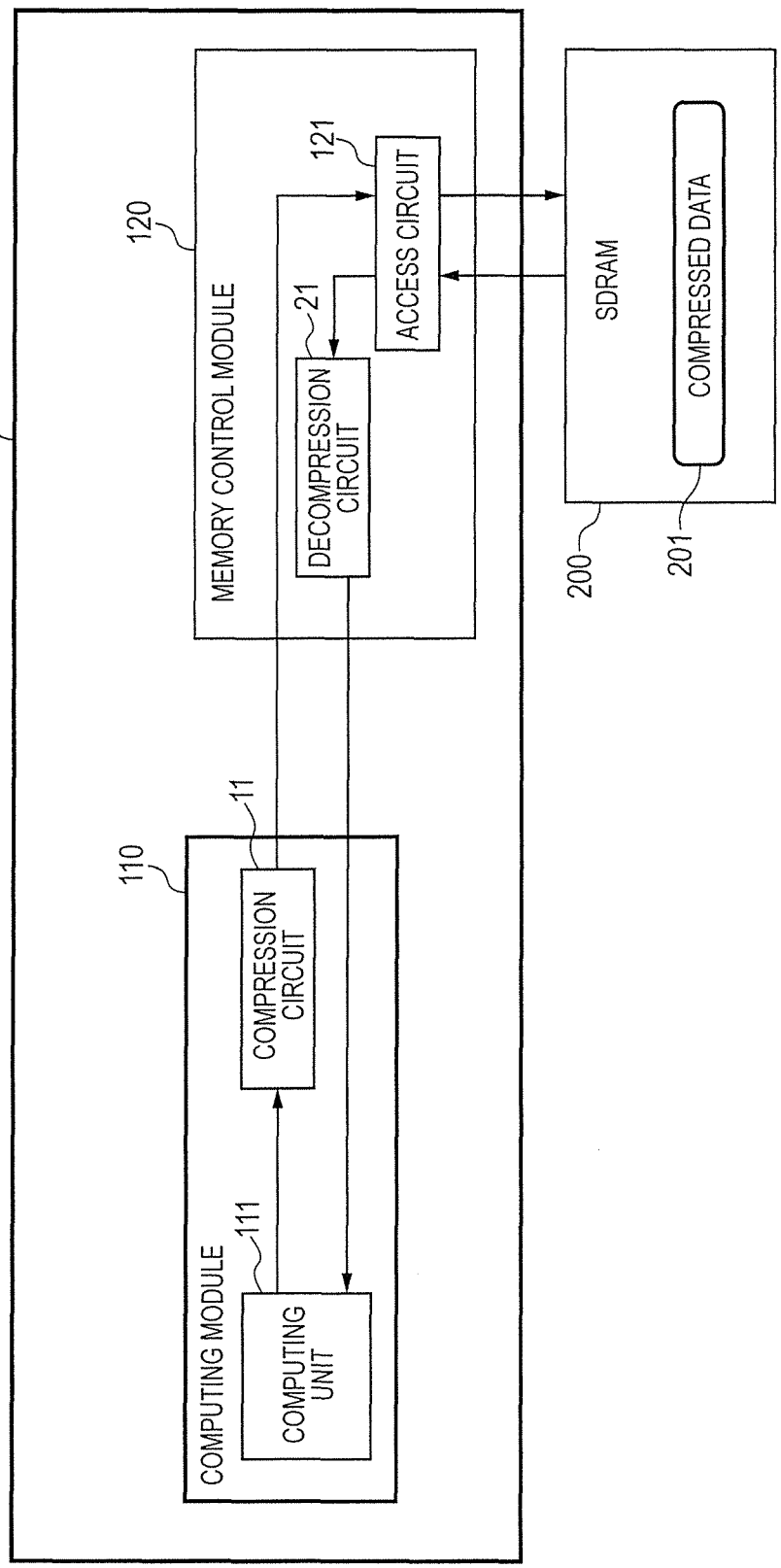
FIG. 5 is a diagram illustrating a schematic configuration of the data processing system according to the first embodiment.

FIG. 4 illustrates a schematic configuration of a data processing system according to the first embodiment. As illustrated in FIG. 4, the data processing system 1 according to the present embodiment includes a semiconductor device 100 and an SDRAM 200. The semiconductor device 100 according to the present embodiment includes plural computing modules 110 (for example, computing modules 110_A-110_C) and a memory control module 120, as is the case with the first to third basic examples. The computing modules 110 each include a computing unit 111 (111_A-111_C). Some computing modules 110 further include a compression circuit (for example, a compression circuit 11_A, 11_B). The memory control module 120 includes an access circuit 121 and a decompression circuit 21. As illustrated in FIG. 5, the semiconductor device 100 according to the present embodiment may at least include a computing module 110 and a memory control module 120 that are depicted in FIG. 4. More specifically, at least the computing module 110 includes a computing unit (arithmetic processing section) 111, which performs arithmetic processing, and a compression circuit (compression section) 11, which compresses data indicative of the result of arithmetic processing, and the memory control module 120 includes an access circuit (access section) 121, which writes compressed data into the SDRAM (memory) 200 and reads written data from the SDRAM 200, and a decompression circuit (decompression section) 21, which decompresses the data read from the SDRAM 200 and outputs the decompressed data to the computing module 110.

As described above, the data processing system according to the present embodiment, which includes the computing section (computing module) and the memory control section (memory control module), is characterized so that the computing section includes the compression circuit, which compresses data to be outputted, and that the memory control section includes the decompression circuit, which decompresses data read from the memory (decompresses the data when it is compressed). As the computing section includes the compression circuit, compression can be performed in accordance with the data of the computing unit. As the decompression circuit in the memory control section decompresses compressed data and then transmits the decompressed data to each computing section, all the computing sections can use both compressed data and uncompressed data stored in the memory. Not all the computing sections need to include the decompression circuit. This makes it possible to suppress an increase in the circuit area.

Configuration of First Embodiment

Figure 6:
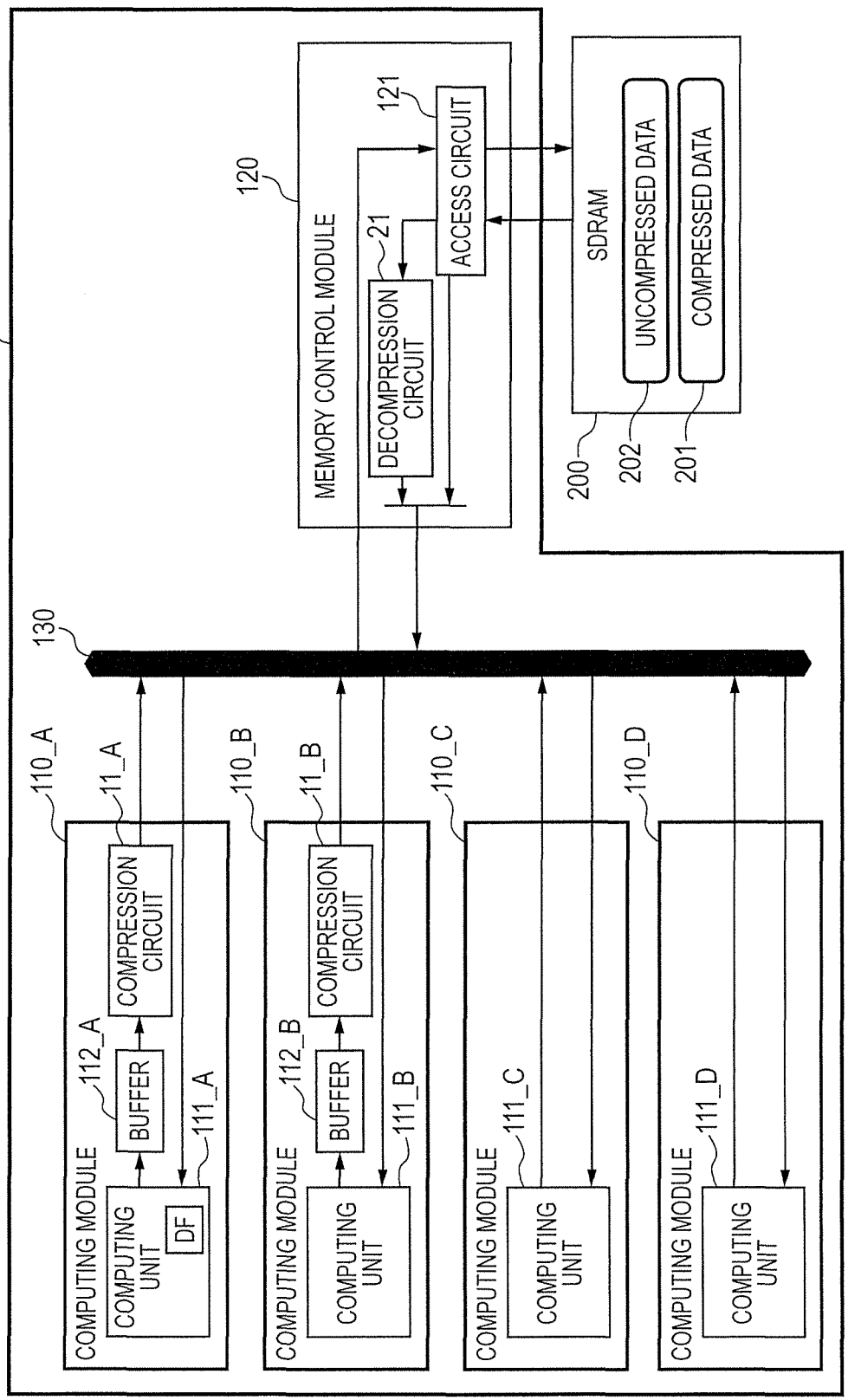
FIG. 6 is a diagram illustrating an exemplary configuration of the data processing system according to the first embodiment.

FIG. 6 illustrates a detailed exemplary configuration of the data processing system according to the present embodiment. As illustrated in FIG. 6, the semiconductor device 100 according to the present embodiment is configured so that some computing modules 110 include a buffer 112 in addition to the element depicted in FIG. 4.

The semiconductor device 100 is configured so that each computing module 110 includes the computing unit 111, the buffer 112, and the compression circuit 11. The buffer 112 is a conversion section that converts data indicative of the result of arithmetic processing to data formed in units of compression processing, retains output data from the computing unit ill, which indicates the result of computation by the computing unit 111, in a compression data structure suitable for compression, and transfers the data retained in the compression data structure to the compression circuit 11. The compression circuit 11 compresses inputted data and transfers the compressed data to the memory control module 120 through the data bus 130. The memory control module 120 stores the transferred compressed data 201 in the external SDRAM 200. The decompression circuit 21 is disposed in the memory control module 120 so that compressed data 201 read from the SDRAM 200 is decompressed before being transmitted to the data bus 130. A computing module 110 requesting a read transmits a control signal, which indicates whether data is compressed or uncompressed, to the memory control module 120.

In the example of FIG. 6, the semiconductor device 100 includes computing modules 110_A-110_D. For example, the computing modules 110_A, 110_B respectively include computing units 111_A, 111_B, buffers 112_A, 112_B, and compression circuits 11_A, 11_B, and the computing modules 110_C, 110_D respectively include computing units 111_C, 111_D.

For example, the computing module 110_A (computing unit 111_A) is a decoder that decodes image data (video data). The computing module 110_A decodes data, then compresses the decoded data, and stores the resulting compressed data 201 in the SDRAM 200.

The computing module 110_B (computing unit 111_B) is an image processing device (GPU) that performs image processing (video processing), such as magnification and reduction, on image data decoded by the computing module 110_A. The computing module 110_B acquires decoded compressed data 201 from the SDRAM 200 through the decompression circuit 21, performs image processing on the acquired data, compresses the image-processed data to obtain compressed data 201, and stores the compressed data 201 in the SDRAM 200.

The computing module 110_C (computing unit 111_C) uses the image-processed data, which is acquired from the computing module 110_B, in order to generate display screen data, for example, by adding a GUI such as a menu. The computing module 110_C acquires the image-processed compressed data 201 from the SDRAM 200 through the decompression circuit 21, then generates the display screen data, and stores the generated display screen data in the SDRAM 200 as uncompressed data 202.

The computing module 110_D (computing unit 111_D) is a CPU that performs an application process by using the results of operation control and computation by the computing modules 110_A-110_C. The computing module 110_D acquires the uncompressed data 202, such as the display screen data, from the SDRAM 200, then performs an application process on the uncompressed data 202, and stores the processed uncompressed data 202 in the SDRAM 200.

Operations of First Embodiment

First of all, operations performed by the computing module 110 (for example, the computing module 110_A) according to the present embodiment will be described.

The compression circuit 11 reduces the amount of data by compressing the data through the use of its redundancy. For example, image data is compressed by using the difference between target pixels and reference pixels. Therefore, nearby pixels tend to be compressed at a high compression ratio due to their small difference. Consequently, compression is preferably performed in units of continuous data (data at consecutive addresses such as block data) having a predetermined length in order to efficiently reduce the amount of data by compression.

However, data outputted from the computing units 111 do not always have a structure suitable for compression. More specifically, the order of data outputted from the computing units 111 may disagree with the order of addresses of a buffer of the SDRAM 200 depending on the processing performed by the computing units 111 and the characteristics of data. In such an instance, the data is fragmented at places where the addresses are not consecutive. Therefore, the data cannot be efficiently compressed. In view of these circumstances, the present embodiment does not directly compress output data from the computing units 111, but stores the output data in the buffers 112, converts the output data in the buffers 112 to a structure suitable for compression (to a structure having a predetermined length and consecutive addresses), and then allows the compression circuits 11 to compress the output data.

The following describes an example in which a computing unit 111 (for example, the computing unit 111_A) is a decoder having a deblocking filter complaint with the H.265 video compression standard and the output of the decoder is converted to a compressed data structure of continuous 256-byte data for 4 vertical pixel lines of 64 horizontal pixels.

According to the H.265 video compression standard, a video image is compressed in units of individual images (pictures). Compressed pictures are roughly classified into three types: I, P, and B.

An I picture is compressed by using only the data on its picture and can be decoded in units of the picture. A P or B picture is compressed by using the difference between the picture and a previous decoding result (decoded image). Therefore, the P and B pictures can be smaller in compressed data size than the I picture. When difference data is to be generated for the P or B picture, data at an arbitrary position can be selected from a decoded image to be referenced. For example, the data at a position minimizing the amount of compressed data is selected.

According to the H.265 standard, a deblocking filter is employed to improve video image compression efficiency and subjective video image quality. The computing unit 111 includes the deblocking filter DF. The deblocking filter DF reduces block distortion that arises during image decoding.

For example, the computing unit 111 achieves decoding by performing entropy decoding or reverse quantization/inverse transform, and the deblocking filter DF is used as an in-loop filter at a final stage of decoding. Therefore, the H.265 decoded image outputted from the computing unit 111 is deblocking-filtered data. That is to say, data can be sequentially stored in the buffer of the SDRAM beginning with the deblocking-filtered data. The order in which positions on an image are to be processed by the deblocking filter DF is defined by the H.265 standard. Consequently, the order in which the computing unit 111 outputs data varies with the position within the image that is processed.

According to the H.265 standard, an encoding process and a decoding process are performed in units of a square pixel block called a CTB (Coding Tree Block). The size of the CTB is selectable. In some cases, the selectable sizes are 16×16 pixels, 32×32 pixels, and 64×64 pixels. The following describes an example in which the CTB size is 64×64 pixels.

Figure 7:
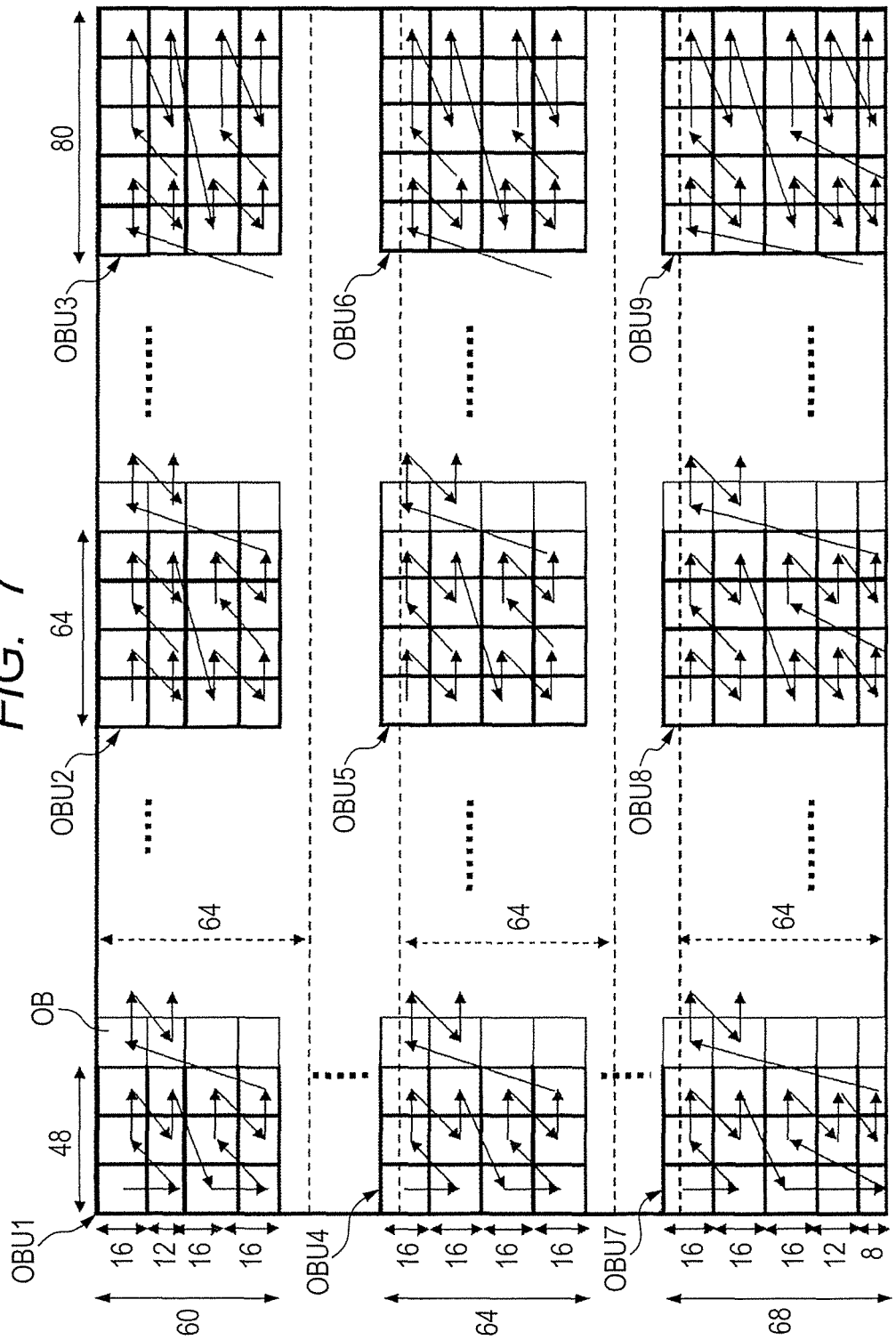
FIG. 7 is a diagram illustrating the output data of a computing unit according to the first embodiment.
Figure 8:
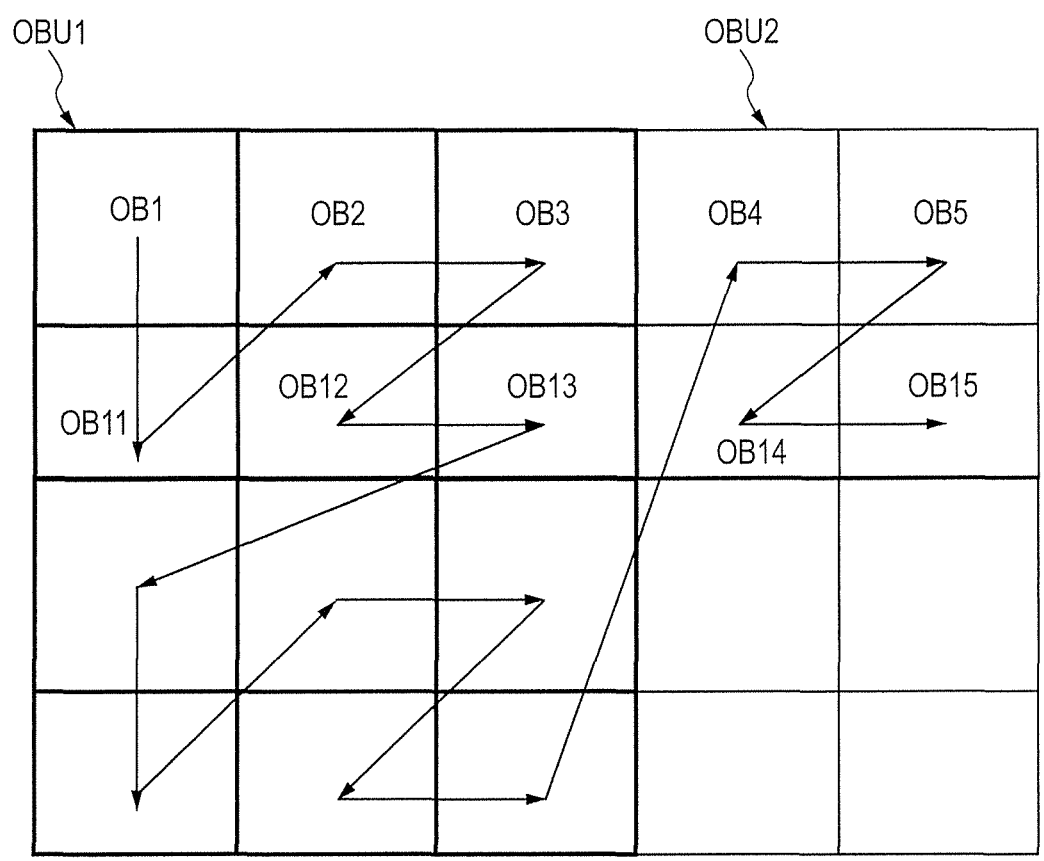
FIG. 8 is a diagram illustrating the output data of the computing unit according to the first embodiment.

FIG. 7 illustrates the order in which brightness data is outputted when the CTB size is 64×64 pixels. FIG. 8 is an enlarged view illustrating a part of FIG. 7. As illustrated in FIG. 7, the computing unit 111 continuously outputs data of 8, 12, and 16 pixels in the vertical direction in units of a line of 16 horizontal pixels depending on the position of a pixel to be processed. That is to say, the data is outputted as indicated by the arrows in FIGS. 7 and 8 in units of output blocks OB of 16×8 pixels, 16×12 pixels, and 16×16 pixels.

According to the H.265 standard, the CTB is further divided into hierarchical blocks in order to perform an encoding process and a decoding process. For example, the CTB is divided into plural CBs (Coding Blocks), and each CB is subdivided into plural PBs (Prediction Blocks) or TBs (Transform Blocks). A series of encoding/decoding processes, such as an intra-prediction/inter-prediction process, transform/quantization and reverse quantization/inverse transform processes, and an entropy encoding/decoding process, is performed in units of a CB. The intra-prediction/inter-prediction process is performed in units of a PB. The transform/quantization and reverse quantization/inverse transform processes are performed in units of a TB. The deblocking filter DF performs a filtering process in units of a PB or in units of a TB. The output block OB is, for example, a PB or a TB because the deblocking filter DF performs processing in units of an OB.

The deblocking filter DF performs a filtering process by referencing boundary pixels neighboring a block. Therefore, the deblocking filter DF cannot output data until a filtering process for the next neighboring block (a horizontally or vertically neighboring block) is completed. Consequently, the deblocking filter DF outputs data not in units of the CTB size but in units of a size different from the CTB size.

In the example of FIG. 7, the data outputted from the computing unit 111 is horizontally displaced leftward by 16 pixels and vertically displaced upward by 4 pixels from the position of an image in units of 64×64 pixels. That is to say, the processing units are not the same as for a CTB. The data outputted horizontally is formed of 48 pixels at the leftmost end, 64 pixels midway, and 80 pixels at the rightmost end, and the data outputted vertically is formed of 60 pixels at the uppermost end, 64 pixels midway, and 68 pixels at the lowermost end.

More specifically, a 48×60 pixel output block group OBU1 is first outputted, then a 64×60 pixel output block group OBU2 is outputted continuously in the horizontal direction, and an 80×60 pixel output block group OBU3 is outputted finally in the horizontal direction. The subsequent horizontal direction data are sequentially outputted in order from a 48×64 pixel output block group, a 64×64 pixel output block group, and so on to an 80×64 pixel output block group OBU6. After output block groups OBU4-OBU6 are outputted continuously in the vertical direction, a 48×68 pixel output block group OBU7 is outputted finally in the vertical direction. Subsequently, after a 64×68 pixel output block group OBU8 is outputted continuously in the vertical direction, an 80×68 pixel output block group OBU9 is outputted finally in the vertical direction.

As indicated, for example, in FIG. 8, when the output block groups OBU are outputted, the first output block group OBU1 is outputted in order from an output block OB1, an output block OB11 positioned below, an output block OB2 positioned to the upper right, an output block OB3 positioned to the right, an output block OB12 positioned to the lower left, to an output block OB13 positioned to the right, and so on, and the next output block group OBU2 is outputted in order from an output block OB4, an output block OB5 positioned to the right, an output block OB14 positioned to the lower left, to an output block OB15 positioned to the right, and so on.

As described above, the computing unit 111 outputs data in the order indicated by the arrows in FIGS. 7 and 8. Therefore, if such an output order is employed as is, the resulting positional relationship of image data differs from the actual positional relationship of image data. More specifically, while the actual image is horizontally formed of a continuous sequence of the output blocks OB1, OB2, OB3, OB4, and so on, the outputted data is discontinuous because it is formed of a discontinuous sequence of the output blocks OB1, OB11, OB2, OB3, and so on as indicated by the arrows.

Figure 9:
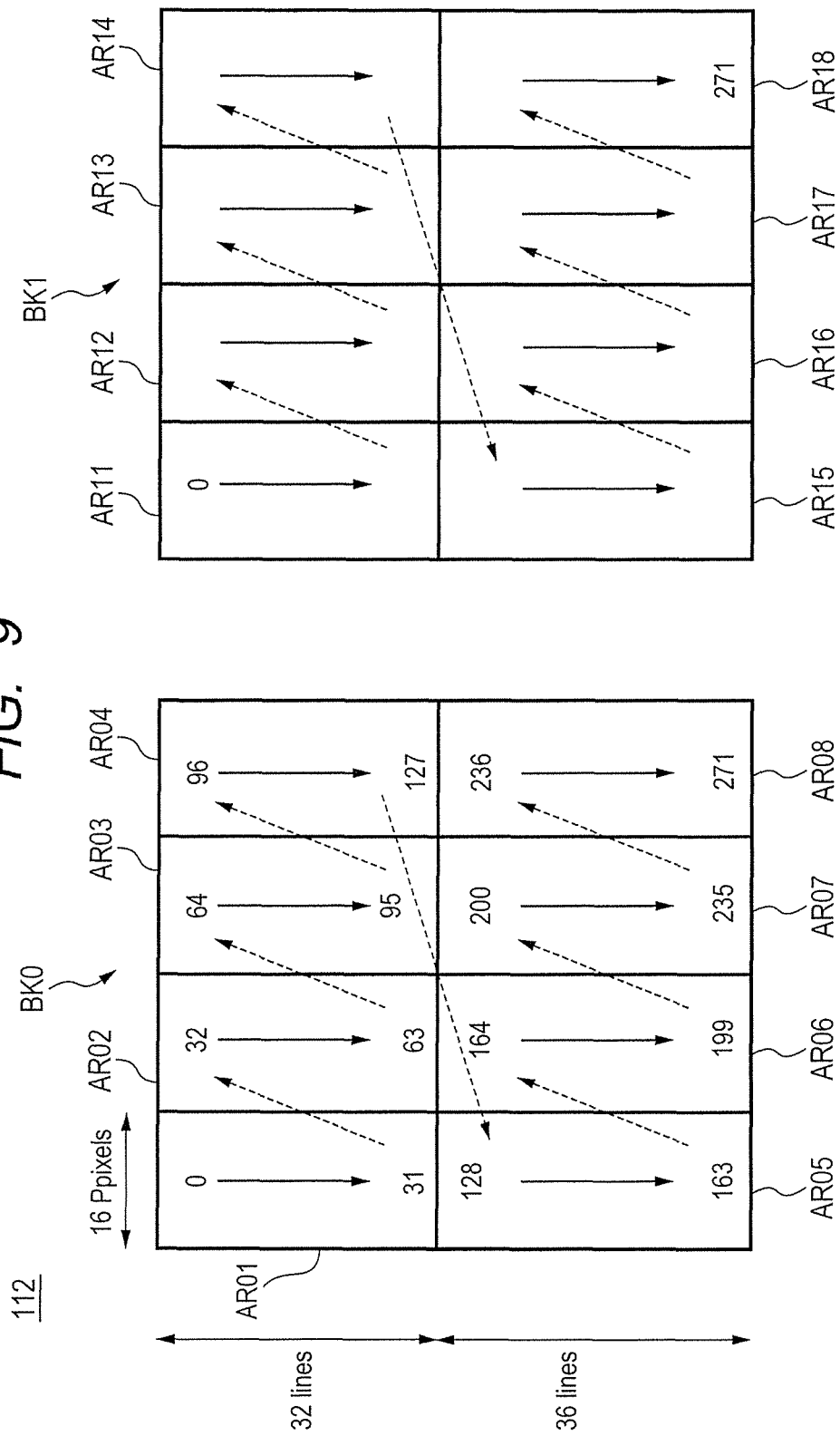
FIG. 9 is a diagram illustrating an exemplary configuration of a buffer according to the first embodiment.

In the present embodiment, the buffers 112 convert the output data depicted in FIGS. 7 and 8 to a continuous image data structure formed in units of 64×4. FIG. 9 illustrates an exemplary configuration that implements the buffers 112. The buffers according to the present embodiment may have the above-mentioned data structure. Therefore, any configuration may be employed for data input and data output. A buffer control section in a buffer 112 may control the input order and output order of data in the buffer 112. An alternative is to let the computing unit control the order of data input to the buffer 112 and let the compression circuit control the order of data output from the buffer 112.

As illustrated in FIG. 9, the buffer 112 includes two banks: a bank BK0 and a bank BK1. The banks BK0, BK1 need not always be physically divided ones. Alternatively, the first half and second half of one physical buffer may be respectively used as the bank BK0 and the bank BK1. The banks BK0, BK1 are of the same size. Each bank is capable of storing data formed of up to 64×68 pixels.

The banks BK0, BK1 have four 16-pixel areas in the horizontal direction and two areas in the vertical direction, namely, a 32-line area and a 36-line area. That is to say, the bank BK0 includes 16×32 pixel areas AR01-AR04 and 16×36 pixel areas AR05-AR08, and the bank BK1 includes 16×2 pixel areas AR11-AR14 and 16×36 pixel areas AR15-AR18.

The 16 pixels in the horizontal areas are of the same size as each output block OB, and the horizontal 64 pixels in the banks are of the same size as the output block groups OBU2, OBU5, OBU8 (or CTB). The 32 lines and 36 lines in the vertical areas are of the same size as the upper two blocks and lower three blocks of the output block groups OBU7, OBU8, OBU9.

Storage operations performed by the buffer 112 when the computing unit 111 outputs data beginning with the upper left of an image will now be described in detail with reference to FIGS. 10 to 14.

Figure 10:
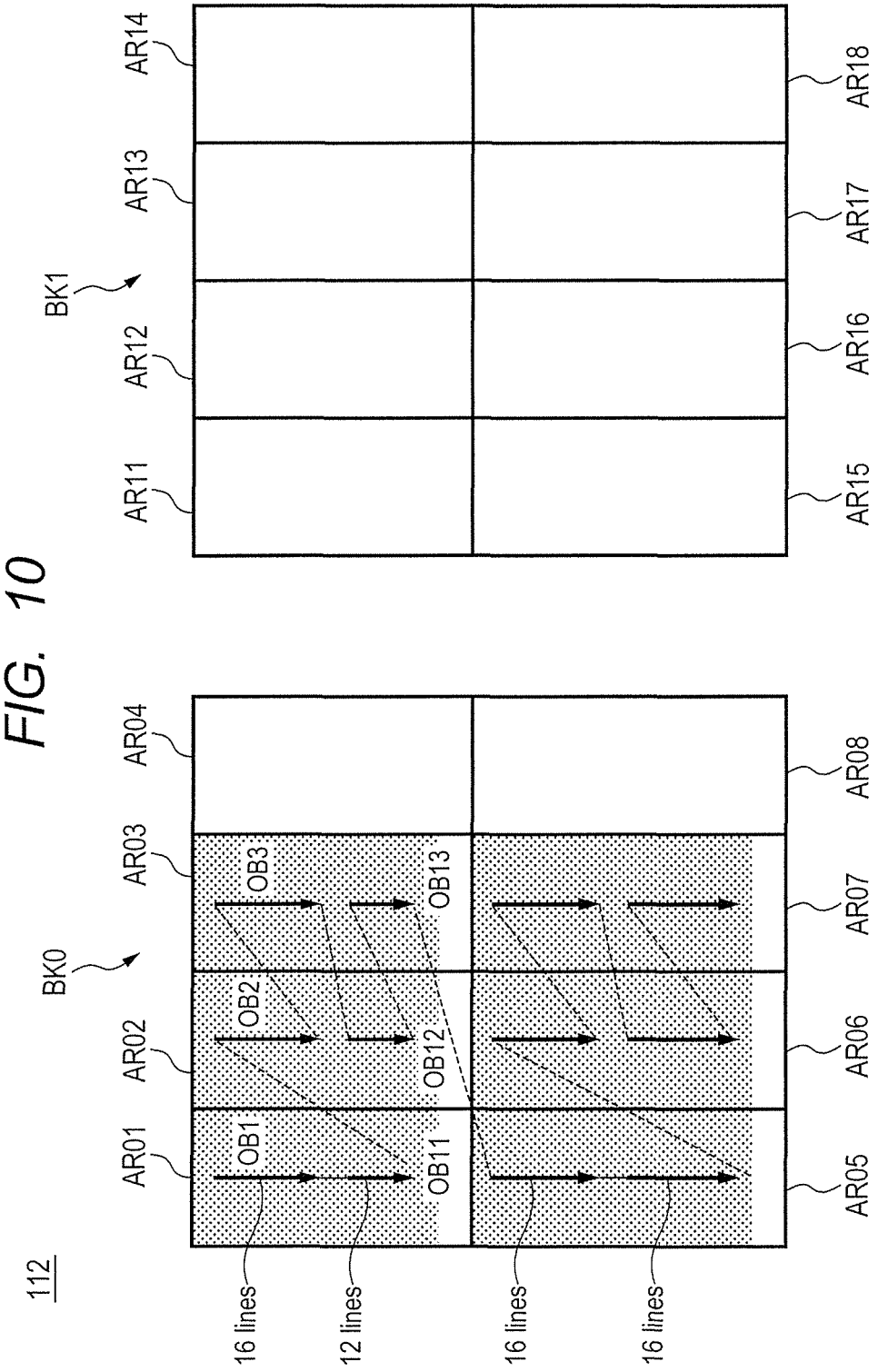
FIG. 10 is a diagram illustrating an input/output operation of the buffer according to the first embodiment.

Output data (OBU1) for the first CTB is formed of 48×60 pixels. As illustrated in FIG. 10, the data in the output block group OBU1 is stored in the bank BK0 of the buffer 112 in the order indicated by the arrows. The blocks in the output block group OBU1 are outputted in the order indicated in FIGS. 7 and 8. Thus, the buffer 112 stores the output blocks OB1, OB11 in the area AR01 in the order named, stores the output block OB2 in the area AR02, stores the output block OB3 in the area AR03, stores the output block OB12 after the output block OB2 in the area AR02, and stores the output block OB13 after the output block OB3 in the area AR03. Subsequently, the data is stored in the areas AR05-AR07 in the order named, and the output block group OBU1 is stored in the bank BK0. At this stage, the areas AR04, AR08 of the bank BK0 are unoccupied, and data in a compression unit of 64×4 is still not readied. Therefore, no data is outputted from the buffer.

Figure 11:
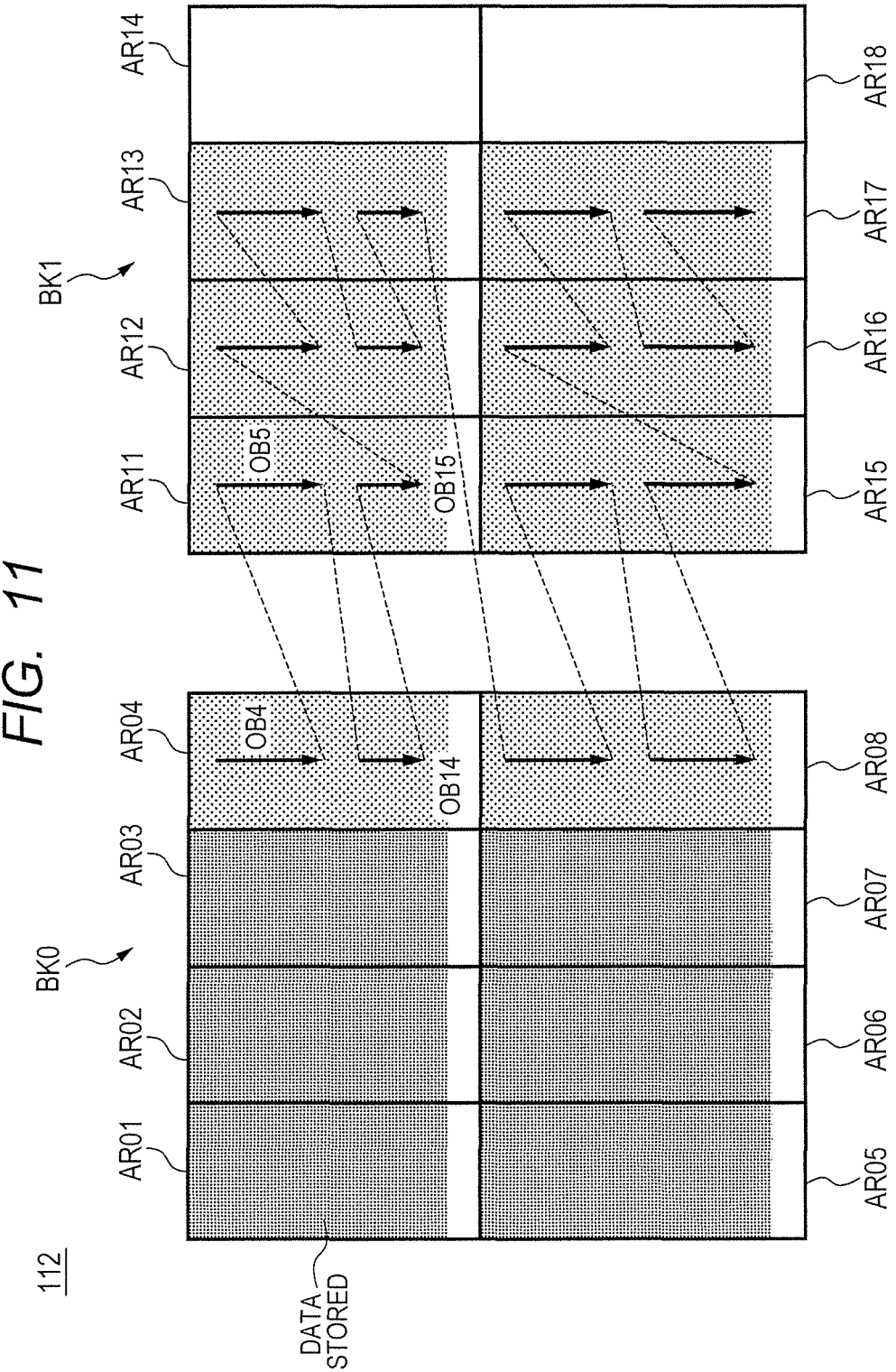
FIG. 11 is a diagram illustrating an input/output operation of the buffer according to the first embodiment.

Output data (OBU2) for the second CTB is formed of 64×60 pixels. As illustrated in FIG. 11, the data in the output block group OBU2 is stored in the banks BK0, BK1 of the buffer 112 in the order indicated by the arrows. In this instance, as the data in the output block group OBU1 is stored in the areas AR01-AR03, AR05-AR07 of the bank BK0, unoccupied areas (AR04 and AR08) of the bank BK0 and the areas of the bank BK1 are used. The blocks in the output block group OBU2 are outputted in the order indicated in FIGS. 7 and 8. Thus, the buffer 112 stores the output block OB4 in the area AR04, stores the output block OB5 in the area AR11, stores the output block OB14 after the output bock OB4 in the area AR04, and stores the output block OB15 after the output block OB3 in the area AR11. Subsequently, the data is stored in the areas AR12-AR14, AR08, AR15-AR18 in the order named.

When the output data (OBU2) for the second CTB is stored in the buffer 112, many continuous data OL in units of 64×4 (compression unit) are readied in the bank BK0 as illustrated in FIG. 12. These continuous data OL are read from the buffer 112 and transmitted to the compression circuit 11.

The compression circuit 11 compresses the continuous data OL, which is received from the buffer 112. The compression circuit 11 may use any compression method as far as the data compressed by the compression circuit 11 can be decompressed by the decompression circuit 21. For example, the DPCM (Differential Pulse Code Modulation) method, a lossless compression method, or a lossy compression method may be used. Upon completion of data compression, the compression circuit 11 transmits the compressed data to the memory control module 120 through the data bus 130. The memory control module 120 stores the received compressed data in the buffer of the SDRAM 200.

Figure 13:
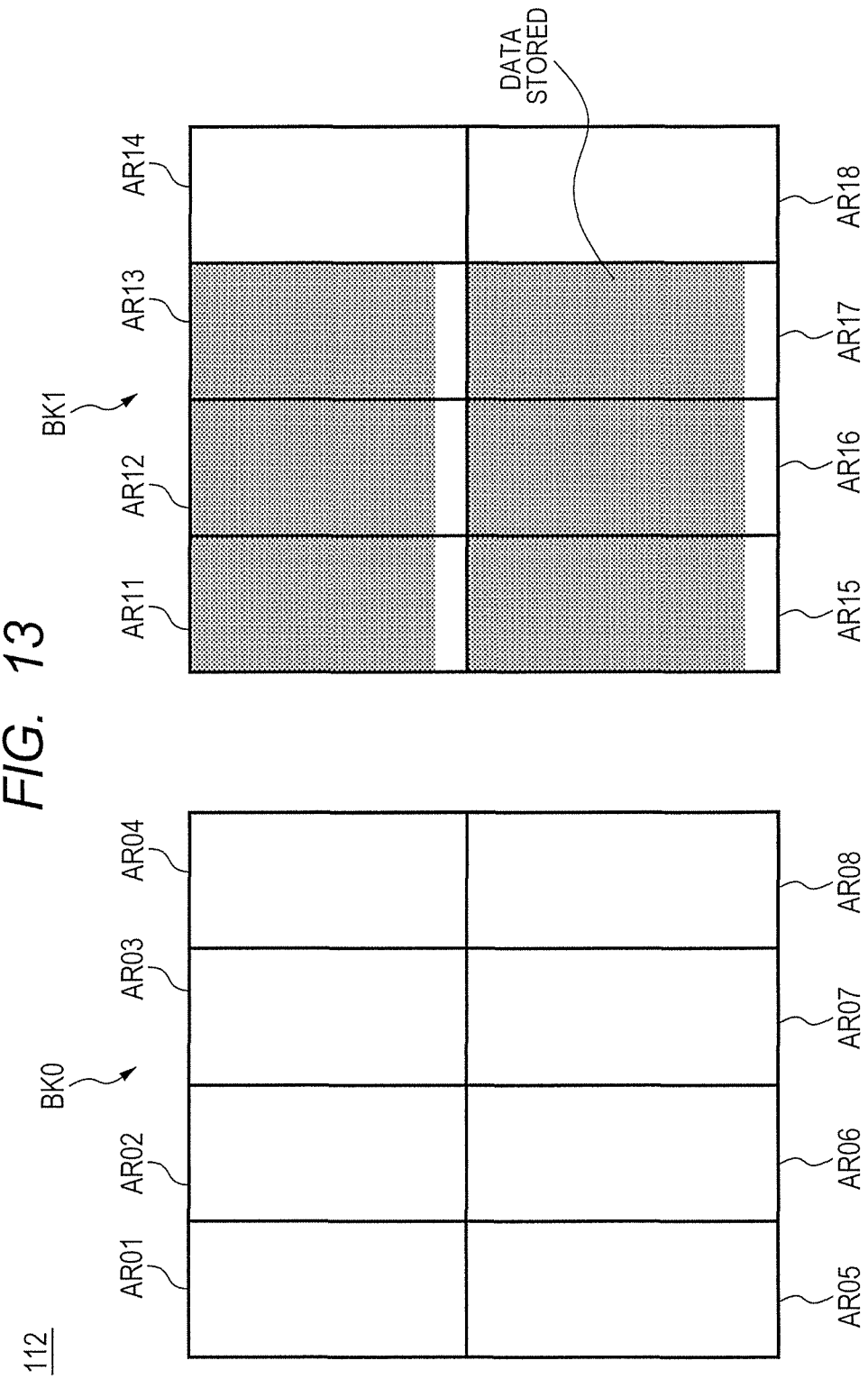
FIG. 13 is a diagram illustrating an input/output operation of the buffer according to the first embodiment.
Figure 14:
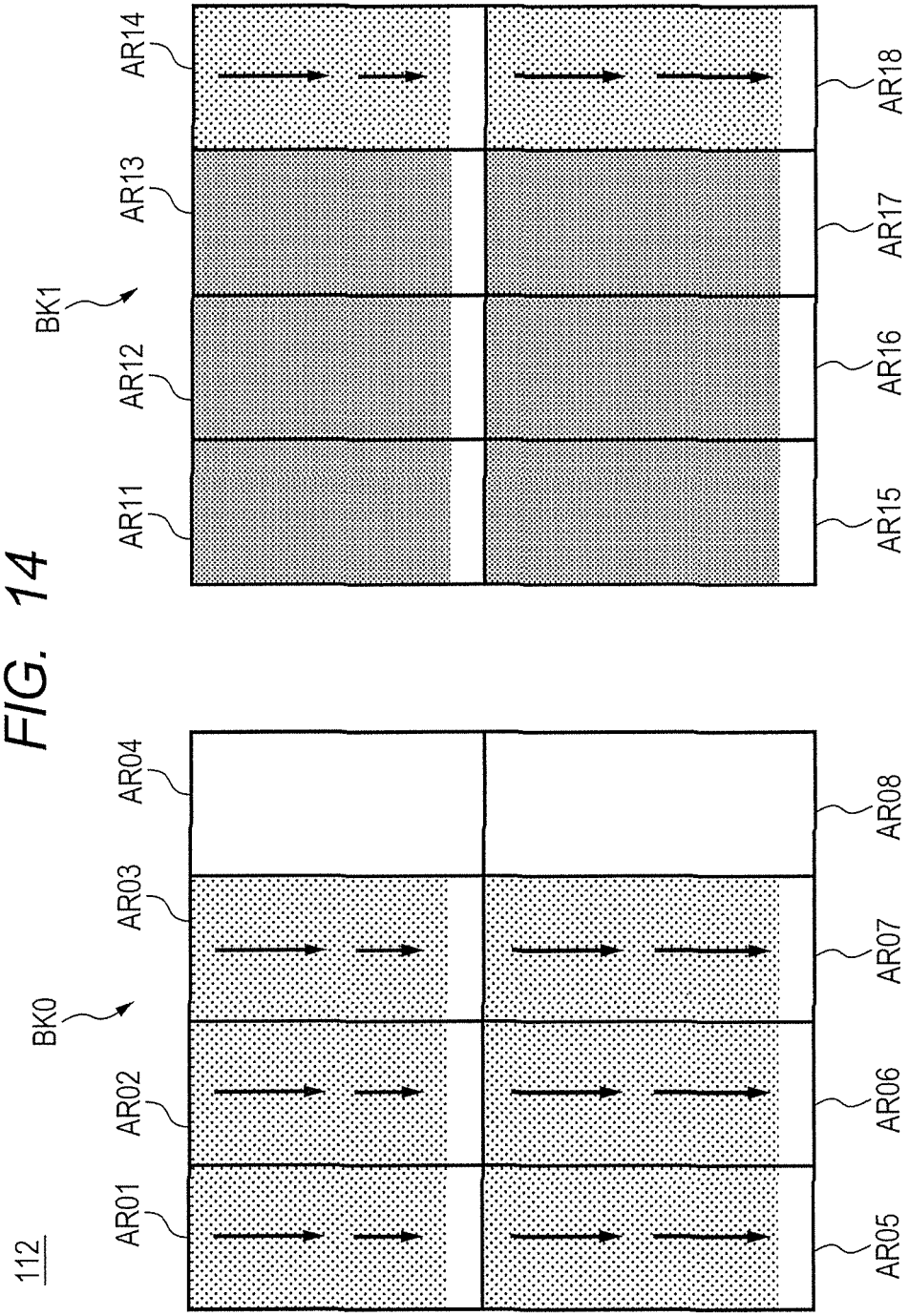
FIG. 14 is a diagram illustrating an input/output operation of the buffer according to the first embodiment.

After the continuous data OL in units of 64×4 are read from the bank BK0, the bank BK0 is unoccupied as illustrated in FIG. 13 and ready to store data. Next, as illustrated in FIG. 14, the unoccupied areas (AR14 and AR18) of the bank BK1 and the unoccupied bank BK0 are used to store output data for the next CTB. Subsequently, the bank BK0 and the bank BK1 are alternately used to repeatedly store data received from the computing unit 111 and read the data in units of 64×4.

In the above example, it is assumed, for simplicity of explanation, that the data in units of 64×4 is read after the entire data for the CTB is stored. In reality, however, the present embodiment is not limited to such a scheme. More specifically, the data in units of 64×4 can be read when it is readied.

An operation performed by the memory control module 120 according to the present embodiment will now be described. The present embodiment is characterized mainly by a memory read operation. Therefore, a read operation is described below.

As illustrated in FIG. 6, the decompression circuit 21 for decompressing compressed data is disposed in the memory control module 120. A computing module 110 requesting a read transmits a read command and a flag to the memory control module 120. The flag indicates whether the data to be read is compressed. In compliance with the read command, the memory control module 120 (access circuit 121) reads data from the SDRAM 200 and references the flag for the command. If the flag indicates that the read data is not compressed, the memory control module 120 transmits the data read from the SDRAM 200, as is, to the computing module 110. If, by contrast, the flag for the command indicates that the read data is compressed, the memory control module 120 forwards the read data to the decompression circuit 21 in the memory control module 120, allows the decompression circuit 21 to decompress the read data, and transmits the decompressed read data to the computing module 110. When the computing module 110 (computing unit) designates the flag, compressed data 201 or uncompressed data 202 can be read under the control of the computing module 110 (computing unit).

Advantageous Effects of First Embodiment

As described above, the present embodiment is configured so that the buffer is disposed in the computing module. Thus, data is buffered and then compressed. Consequently, the data is converted to a data structure suitable for compression in order to increase the compression ratio.

Figure 15:
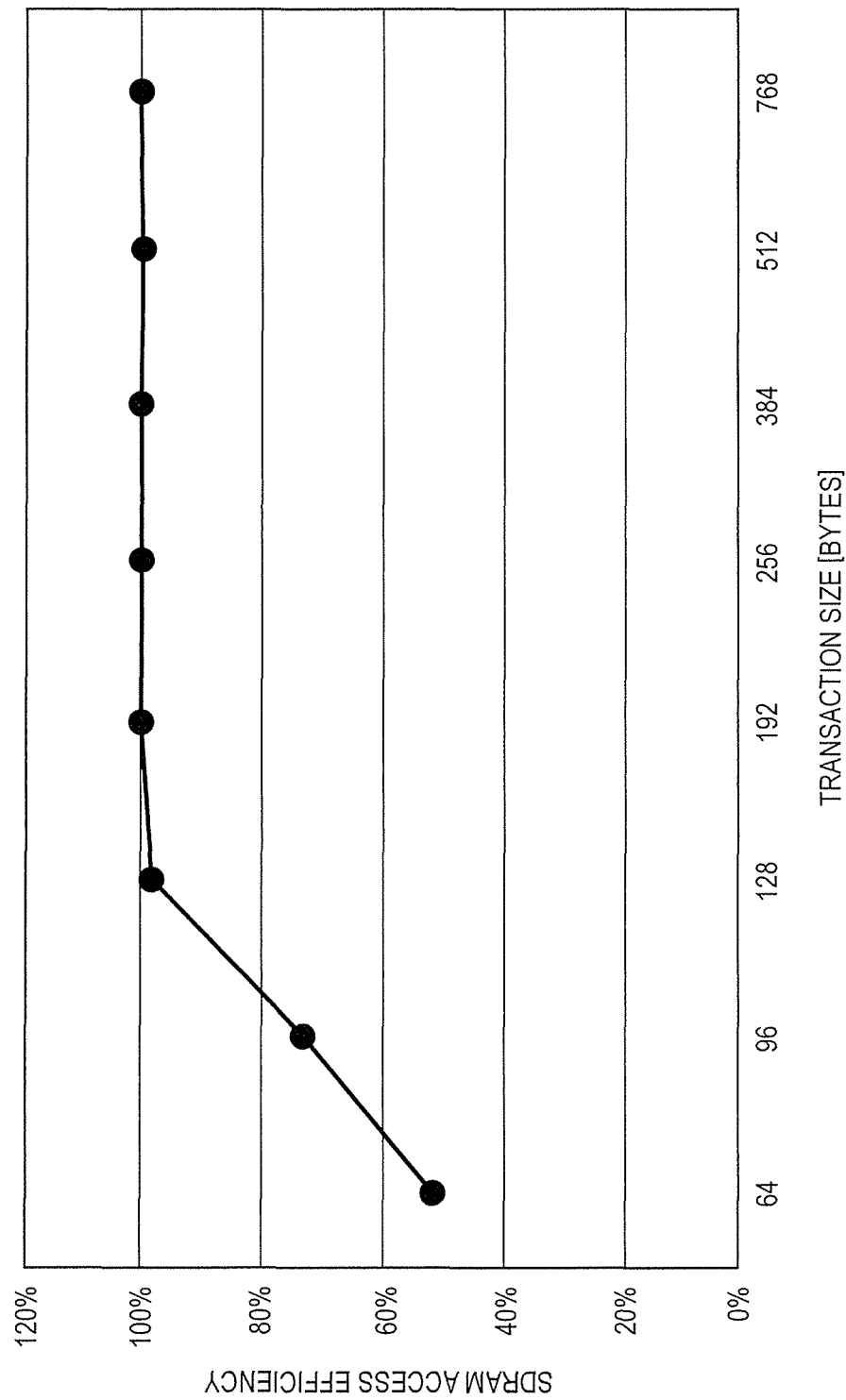
FIG. 15 is a graph illustrating the relationship between data length and memory access efficiency.

Further, the length of uncompressed data is increased. Therefore, even after compression, the length of compressed data is adequate for achieving a high transfer efficiency between the semiconductor device and the SDRAM. The graph of FIG. 15 indicates the transfer efficiency (access efficiency) of the SDRAM with respect to the length of a single data transfer.

Let us assume, for example, that the length of uncompressed data is 128 bytes and subsequently reduced to half, that is, 64 bytes when the data is compressed. When the data length is 128 bytes, the transfer efficiency is nearly 100%. However, when the data length is 64 bytes, the transfer efficiency is approximately 50%. A transfer efficiency of 50% signifies that one out of two transfer periods is unavailable. Thus, the resulting situation is equivalent to a case where 128 bytes are transferred. That is to say, the amount of transfer between the semiconductor device and the SDRAM is not substantially reduced. Consequently, the data length should preferably be made appropriate for achieving efficient transfer even after data compression. For example, a data length of 256 bytes should be reduced to a data length of 128 bytes. It is preferred that the length of compressed data be close to a data transfer length (transfer rate) of 128 bytes.

Moreover, as the memory control module includes the decompression circuit, compressed data can be decompressed before being transmitted to each computing module. Thus, even a computing module without the decompression circuit can use both compressed data and uncompressed data in the SDRAM when information is provided to indicate that compressed data is an access target.

Second Embodiment

A second embodiment of the present invention will now be described with reference to an accompanying drawing. The second embodiment is applicable to the first to third basic examples or to the first embodiment, and is different from the first to third basic examples or to the first embodiment only in the method of compressed data storage.

Figure 16:
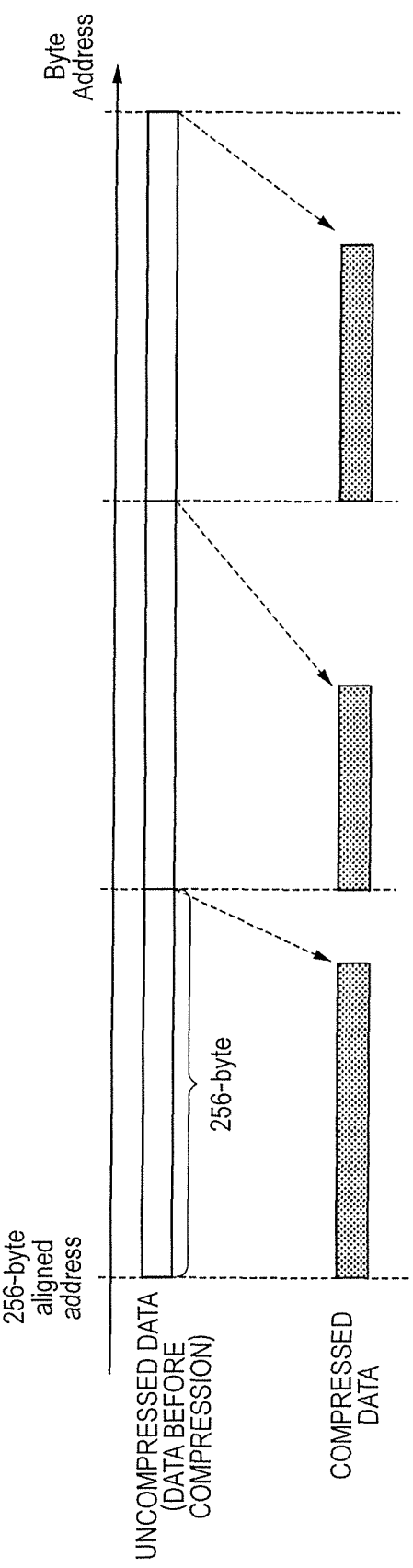
FIG. 16 is a diagram illustrating compressed data according to a second embodiment of the present invention.

FIG. 16 is an image of compressed data storage in the second embodiment. Data is compressed by the compression circuit 11 depicted in FIGS. 1 to 6 as illustrated in FIG. 16, and then stored in the SDRAM.

For example, the compression circuit 11 compresses data outputted from the computing unit 111 in units of 256 bytes. The compressed data is short in data length. Therefore, if the compressed data is continuously stored in the SDRAM, the addresses of the data are misaligned. In order to directly access the data whose addresses are misaligned, the addresses assigned before a change and the addresses assigned after the change need to be stored in association with each other.

In view of the above circumstances, as illustrated in FIG. 16, the present embodiment causes the compression circuit 11 to store compressed data beginning at an initial address for 256 bytes, which is the same as for uncompressed data. More specifically, when storing compressed data in the SDRAM 200, the present embodiment stores only the addresses of the compressed data without changing the initial address for 256 bytes.

As described above, the addresses for compressed data storage in the present embodiment are the same as for the addresses for uncompressed data storage when viewed in units of 256 bytes. This eliminates the necessity of retaining uncompressed data addresses, such as the initial address of the buffer. Further, any compressed data can be accessed in random order (random-accessed).

Third Embodiment

A third embodiment of the present invention will now be described with reference to the accompanying drawings. The third embodiment is applicable to the first or second embodiment, and is different from the first or second embodiment only in the configuration of the memory control module.

Figure 17:
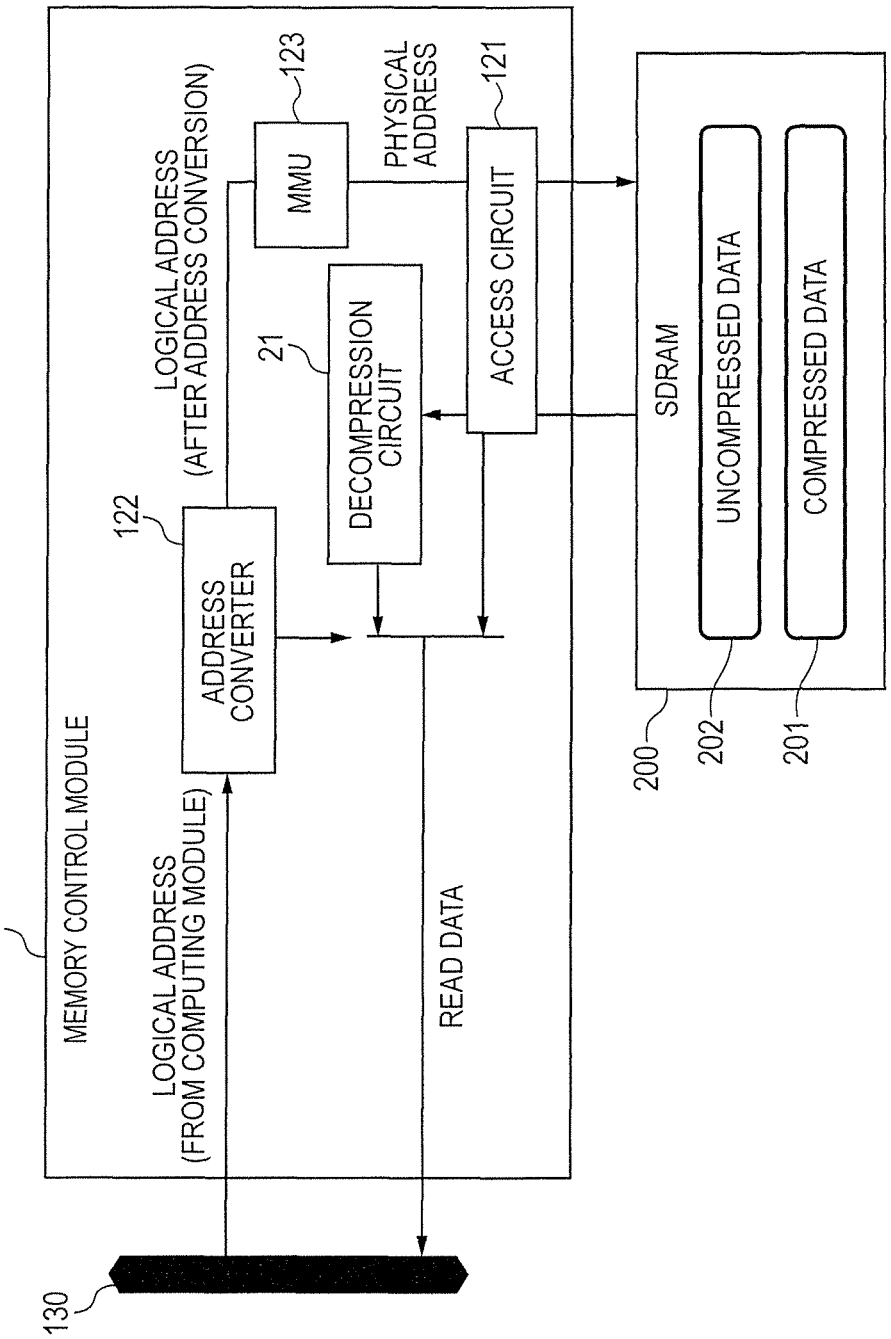
FIG. 17 is a diagram illustrating an exemplary configuration of a memory control module according to a third embodiment of the present invention.
Figure 18:
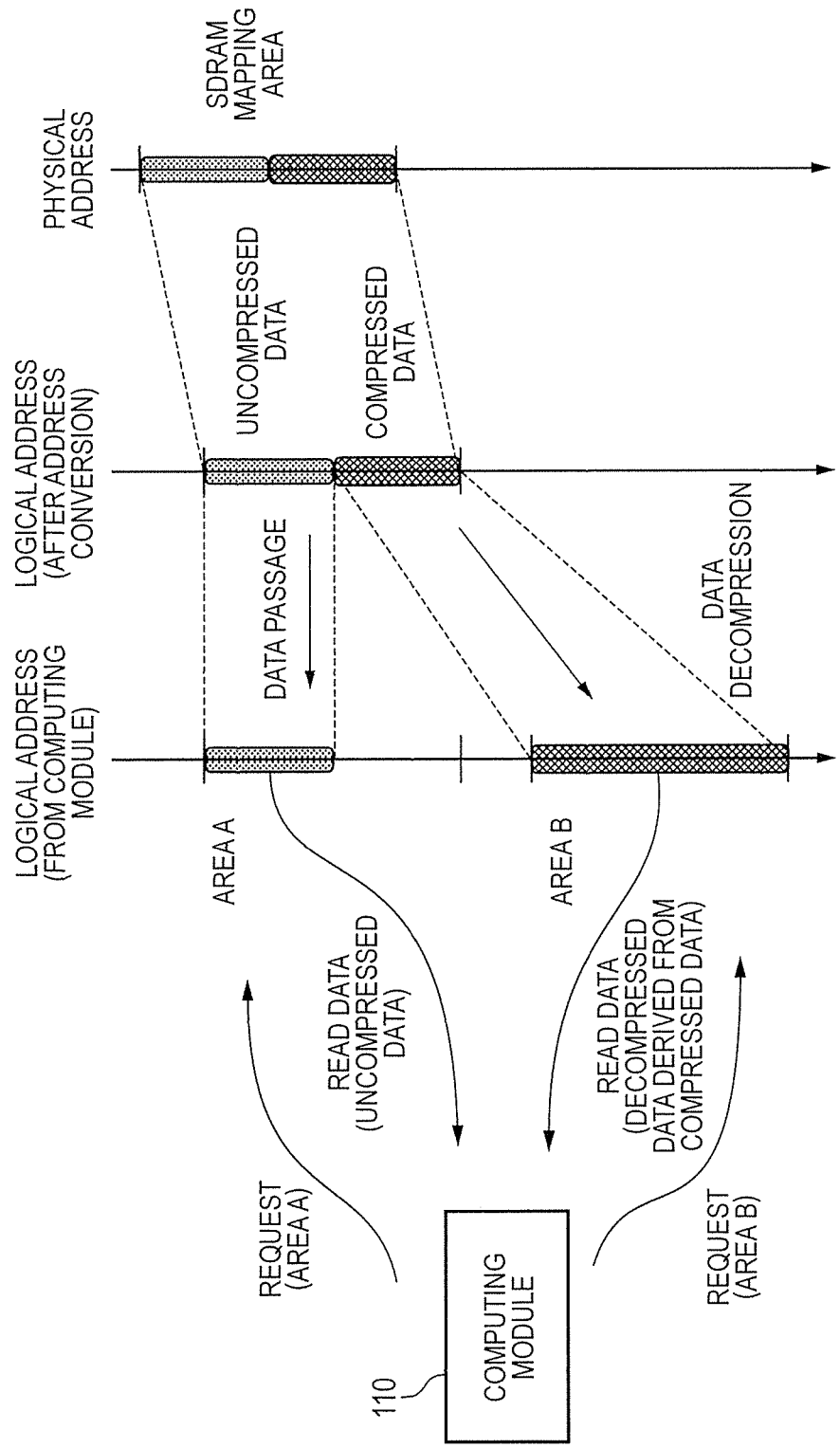
FIG. 18 is a diagram illustrating a memory access operation according to the third embodiment.

FIG. 17 illustrates an exemplary configuration of the memory control module 120 according to the third embodiment. FIG. 18 illustrates an example of a data read operation according to the present embodiment.

As illustrated in FIG. 17, the memory control module 120 according to the present embodiment is obtained by adding an address converter 122 and an MMU (memory management unit) 123 to the memory control module 120 according to the first or second embodiment. The address converter 122 receives a command-designated logical address and converts the received logical address to another logical address. The MMU 123 converts the converted logical address to a physical address in the SDRAM. The access circuit 121 accesses the SDRAM 200 in accordance with the physical address. Further, the address converter 122 (or the decompression circuit 21) determines based on the converted logical address whether data is compressed. For example, the decompression circuit 21 decompresses read data when a requested address is included in a first address area, and does not decompress the read data when the requested address is included in a second address area. Effective memory use can be achieved, for example, when a converted address area of the first address area and a converted address area of the second address area are the same address area in the SDRAM.

In the present embodiment, a logical address area (area A) where compressed data is stored is remapped to another logical address area (area B). When an address in area B is accessed, the address is converted by the address converter 122 to a logical address in area A. For example, the address converter 122 includes a mapping table that maps an unconverted logical address and a converted logical address (and information indicative of whether data is compressed). By referencing the mapping table, the address converter 122 subjects an address to conversion or inverse conversion and determines whether data is compressed or uncompressed.

As illustrated in FIG. 18, data read by accessing area A is determined by the address converter to be uncompressed data read from area A. Therefore, data read from area A of the SDRAM 200 is outputted, as is, to the computing module 110. Data read by accessing area B is determined by the address converter to be compressed data read from area A. Therefore, data read from area A of the SDRAM 200 is decompressed by the decompression circuit 21, and the decompressed data is outputted to the computing module 110 as area B data.

According to the present embodiment, switching between uncompressed data and compressed data can be made in accordance with the address area to be read. That is to say, when data stored in memory is to be read, whether compressed data is to be decompressed can be specified in accordance with the address area to be read. This makes it possible to delete a flag indicative of whether the data outputted from the computing module is compressed. Further, it is possible to have plural areas to be remapped and switch between a compressed type and an uncompressed type for each area.

Fourth Embodiment

A fourth embodiment of the present invention will now be described with reference to the accompanying drawings. The fourth embodiment is applicable to the second or third embodiment, and is different from the second or third embodiment only in mapping of compressed data.

Figure 19:
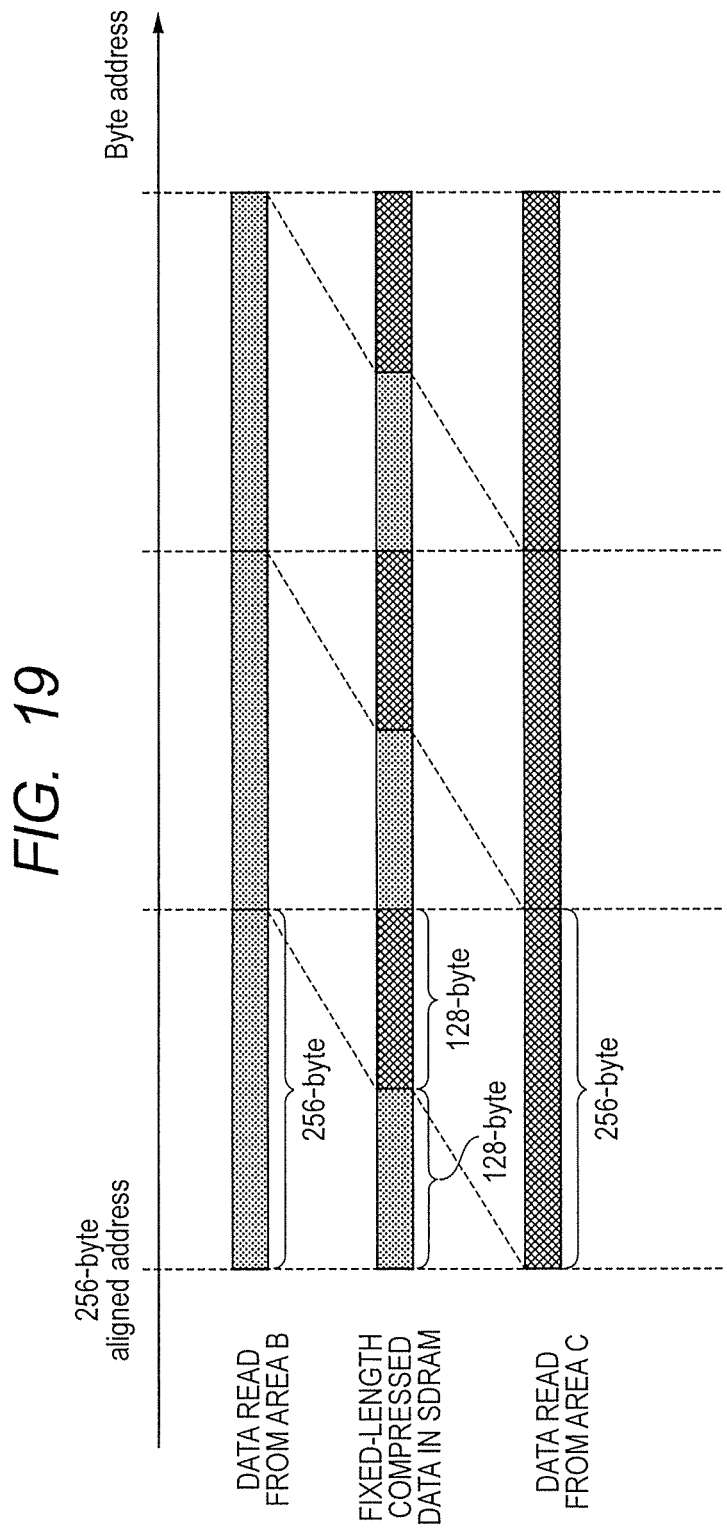
FIG. 19 is a diagram illustrating compressed data according to a fourth embodiment of the present invention.
Figure 20:
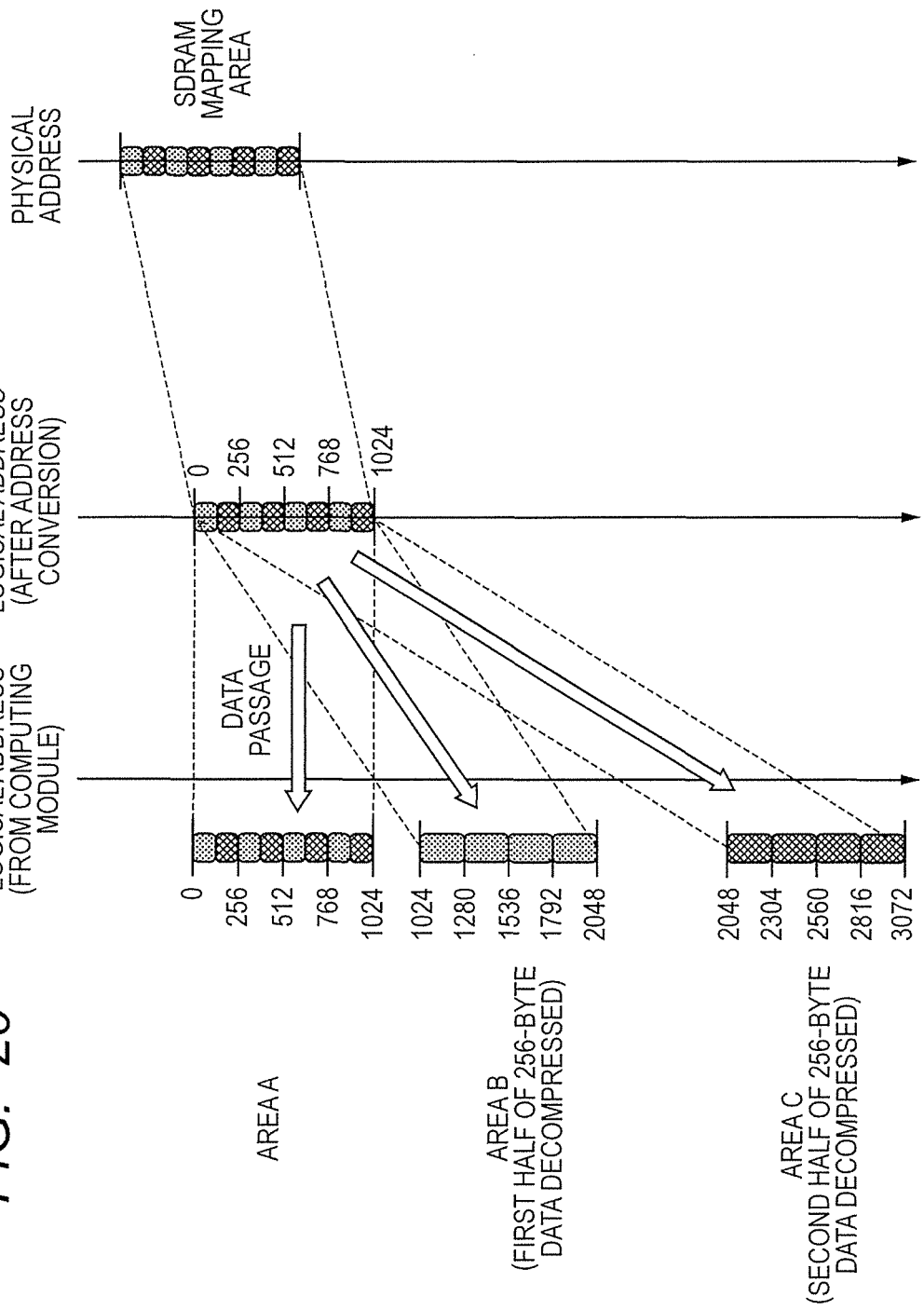
FIG. 20 is a diagram illustrating a memory access operation according to the fourth embodiment.

FIG. 19 is an image of compressed data storage in the fourth embodiment. FIG. 20 illustrates an example of a data read operation according to the present embodiment.

As illustrated in FIG. 19, a fixed-length compression method according to the second embodiment, which compresses 256 bytes to 128 bytes, is used to store data that is compressed by employing different mapping schemes (areas) for the first and second halves of a compression unit of 256 bytes. Although areas A and B are defined in the third embodiment, area C, which is a third remapped area, is additionally defined in the present embodiment. For example, area B is mapped to the first 128 bytes out of 256 bytes, and area C is mapped to the remaining 128 bytes out of 256 bytes. That is to say, area B is accessed to decompress the first 128-byte compressed data out of 256-byte data, and area C is accessed to decompress the remaining 128-byte data. Two data, that is, the first and second halves of a compression unit of 256 bytes, are stored in the above example. However, three or more data may alternatively be stored.

As illustrated in FIG. 20, data read by accessing area A is determined to be passing data (such as uncompressed data requiring no decompression) read from area A. Therefore, data read from area A of the SDRAM 200 is outputted, as is, to the computing module 110. Data read by accessing area B is determined to be compressed data that is to be read from the first 128 bytes out of 256 bytes in area A. Therefore, data read from the first 128 bytes out of 256 bytes in area A of the SDRAM 200 (data 0-125, 256-384, 512-640, and 768-896) is decompressed by the decompression circuit 21, and the decompressed data is outputted to the computing module 110 as data in area B (data 1024-2048). Data read by accessing area C is determined to be compressed data that is to be read from the remaining 128 bytes out of 256 bytes in area A. Therefore, data read from the remaining 128 bytes out of 256 bytes in area A of the SDRAM 200 (data 128-256, 384-512, 640-768, and 896-1024) is decompressed by the decompression circuit 21, and the decompressed data is outputted to the computing module 110 as data in area C (data 2048-3072).

According to the present embodiment, compressed data in plural areas are stored in one area of the SDRAM. Therefore, the buffer size can be doubled in accordance with the size of decompressed data. Further, random access can be achieved as described in conjunction with the second embodiment. Furthermore, a flag indicative of whether the data outputted from the computing module is compressed can be deleted as described in conjunction with the third embodiment.

While the present invention made by its inventors has been described in detail with reference to embodiments, the present invention is not limited to the above-described embodiments. It is to be understood by those skilled in the art that various modifications can be made without departing from the spirit and scope of the present invention.

What is claimed is:

1. A semiconductor device comprising:
   a plurality of computing modules;
   a memory control module; and
   a data bus coupled to the plurality of computing modules and the memory control module,
   wherein each of the plurality of computing modules includes an arithmetic processing section that performs arithmetic processing and outputs data based on a characteristic of the arithmetic processing;
   wherein each of at least two of the plurality of computing modules further includes:
      a conversion section that converts data indicative of a result of the arithmetic processing to data formed in units of compression processing, the data formed in units of compression processing being data structured to have a predetermined length and consecutive addresses to be read from the conversion section; and
      a compression section that reads the data formed in units of compression processing from the conversion section, compresses the data formed in units of compression processing, and transfers the compressed data to the memory control module through the data bus,
   wherein the arithmetic processing section of one of the plurality of computing modules performs arithmetic processing on a result of arithmetic processing of another one of the plurality of computing modules, and
   wherein the memory control module includes:
      an access section that writes the compressed data into a memory and reads the written data from the memory; and
      a decompression section that decompresses data read from the memory and outputs the decompressed data to the data bus for one of the plurality of computing modules.

2. The semiconductor device according to claim 1, wherein the conversion section is a buffer that stores the data indicative of the result of the arithmetic processing in units of the compression processing.

3. The semiconductor device according to claim 2,
   wherein the arithmetic processing section sequentially outputs data having non-consecutive addresses in units of the arithmetic processing, and
   wherein the buffer stores the outputted data in such a manner that the outputted data have consecutive addresses.

4. The semiconductor device according to claim 1, wherein, when data read from the memory is compressed, the decompression section decompresses the data.

5. The semiconductor device according to claim 4,
   wherein, when reading data from the memory, the arithmetic processing section outputs a memory read command and a flag indicative of whether the data is compressed or uncompressed, and
   wherein, when data read from the memory is compressed, the decompression section decompresses the data in accordance with the flag.

6. The semiconductor device according to claim 1, wherein the compression section compresses data in predetermined compression units and writes the compressed data into the memory with initial addresses of the compression units being identical with corresponding addresses used before compression.

7. The semiconductor device according to claim 1,
   wherein the memory control module includes an address conversion section that converts a requested address that is an address requested by each of the plurality of computing module, and
   wherein the access section accesses the memory in accordance with the converted address.

8. The semiconductor device according to claim 7, wherein the decompression section decompresses the data when the requested address is included in a first address area and does not decompress the data when the requested address is included in a second address area.

9. The semiconductor device according to claim 8,
   wherein an address area obtained by converting the first address area and an address area obtained by converting the second address area are included in the same address area of the memory,
   wherein read data from the same address area of the memory is decompressed by the decompression circuit and outputted to each of the plurality of computing modules when the requested address is included in the first address area, and wherein the read data from the same address area of the memory is outputted to each of the plurality of computing modules as uncompressed data when the requested address is included in the second address area.

10. The semiconductor device according to claim 7,
wherein the compression section compresses data in predetermined compression units and requests the data in the compression units to be written into the memory, and wherein the address conversion section further includes a mapping table that maps the requested address and the converted address and converts the address in such a manner that a plurality of data in the compression units are included in the same address area of the memory.

11. The semiconductor device according to claim 10, wherein the decompression section decompresses data in a first memory area within address areas of the memory when the requested address is included in a first address area, and decompresses data in a second memory area within the address areas of the memory when the requested address is included in a second address area.

12. The semiconductor device according to claim 1, wherein the characteristic of the arithmetic processing includes address at which transfer of output data begins, length of transfer, format of data indicative of continuous or discrete data.

13. The semiconductor device according to claim 1, wherein the characteristic of the arithmetic processing of the arithmetic processing section of the one of the plurality of computing modules and the characteristic of the arithmetic processing of the other one of the plurality of computing modules vary from one another.

14. A data processing system comprising:
a semiconductor device; and
a memory that stores data of the semiconductor device, wherein the semiconductor device includes:
a plurality of computing modules;
a memory control module; and
a data bus coupled to the plurality of computing modules and the memory control module,
wherein each of the plurality of computing modules includes an arithmetic processing section that performs arithmetic processing and outputs data based on a characteristic of the arithmetic processing;
wherein each of at least two of the plurality of computing modules further includes:
a conversion section that converts data indicative of a result of the arithmetic processing to data formed in units of compression processing, the data formed in units of compression processing being data structured to have a predetermined length and consecutive addresses to be read from the conversion section; and
a compression section that reads the data formed in units of compression processing from the conversion section, compresses the data formed in units of compression processing, and transfers the compressed data to the memory control module through the data bus, wherein the arithmetic processing section of one of the plurality of computing modules performs arithmetic processing on a result of arithmetic processing of another one of the plurality of computing modules, and wherein the memory control module includes:
an access section that writes the compressed data into the memory and reads the written data from the memory; and
a decompression section that decompresses data read from the memory and outputs the decompressed data to the data bus for one of the plurality of computing modules.

15. A semiconductor device control method for a semiconductor device having a plurality of computing modules, a memory control module, and a data bus coupled to the plurality of computing modules and the memory control module, wherein each of the plurality of computing modules includes an arithmetic processing section that performs arithmetic processing, and each of at least two of the plurality of computing modules further includes: a conversion section that converts data indicative of a result of the arithmetic processing to data formed in units of compression processing; and a compression section that compresses the data formed in units of compression processing, the semiconductor device control method comprising the steps of:

by one computing module, performing arithmetic processing and outputting data based on a characteristic of the arithmetic processing;

by the one computing module having the conversion section converting, converting the data indicative of the result of the arithmetic processing to the data formed in units of compression processing, the data formed in units of compression processing being data structured to have a predetermined length and consecutive addresses to be read from the conversion section; and by the one computing module having the compression section, reading the data formed in units of compression processing from the conversion section, compressing the data formed in units of compression processing, and transferring the compressed data to the memory control module through the data bus;

by the arithmetic processing section of one computing module, performing arithmetic processing on a result of the arithmetic processing of another computing module;

by the memory control module, writing the compressed data into a memory and reading the written data from the memory; and by the memory control module, decompressing data read from the memory and outputting the decompressed data to the data bus for one of the plurality of computing modules.

* * * * *